US012207044B2

(12) United States Patent
Zhang et al.

(10) Patent No.: US 12,207,044 B2
(45) Date of Patent: Jan. 21, 2025

(54) ACOUSTIC OUTPUT DEVICE

(71) Applicant: SHENZHEN SHOKZ CO., LTD., Guangdong (CN)

(72) Inventors: Lei Zhang, Shenzhen (CN); Xin Qi, Shenzhen (CN); Junjiang Fu, Shenzhen (CN); Zhen Wang, Shenzhen (CN); Liwei Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 138 days.

(21) Appl. No.: 17/819,322

(22) Filed: Aug. 12, 2022

(65) Prior Publication Data

US 2022/0386021 A1 Dec. 1, 2022

Related U.S. Application Data

(63) Continuation of application No. PCT/CN2020/128160, filed on Nov. 11, 2020.

(30) Foreign Application Priority Data

Mar. 31, 2020 (CN) ......................... 202010247338.2

(51) Int. Cl.
*H04R 1/28* (2006.01)
*H04R 1/10* (2006.01)
(Continued)

(52) U.S. Cl.
CPC ......... *H04R 1/2803* (2013.01); *H04R 1/1016* (2013.01); *H04R 1/105* (2013.01);
(Continued)

(58) Field of Classification Search
CPC .... H04R 1/288; H04R 1/1075; H04R 1/1016; H04R 1/1058; H04R 2460/13;
(Continued)

(56) References Cited

U.S. PATENT DOCUMENTS 10,728,649 B1 * 7/2020 Holman ............... H04R 1/1091
2006/0262954 A1 * 11/2006 Lee ......................... H04M 1/03 381/380
(Continued)

FOREIGN PATENT DOCUMENTS

CN 1741682 A 3/2006
CN 202514048 U 10/2012
(Continued)

OTHER PUBLICATIONS

Decision of Grant in Russian Application No. 2022122705 mailed on Feb. 7, 2023, 26 pages.
(Continued)

*Primary Examiner* — Carolyn R Edwards
*Assistant Examiner* — Julie X Dang
(74) *Attorney, Agent, or Firm* — METIS IP LLC

(57) ABSTRACT

The present disclosure provides an acoustic output device. The acoustic output device may comprise a bone conduction speaker configured to generate bone conduction acoustic waves. The acoustic output device may also comprise an air conduction speaker configured to generate air conduction acoustic waves, the air conduction speaker being independent of the bone conduction speaker. The acoustic output device may further comprise at least one housing configured to accommodate the bone conduction speaker and the air conduction speaker.

17 Claims, 15 Drawing Sheets

(51) Int. Cl.
*H04R 1/34* (2006.01)
*H04R 7/16* (2006.01)
*H04R 9/02* (2006.01)
*H04R 9/06* (2006.01)

(52) U.S. Cl.
CPC ............... *H04R 1/345* (2013.01); *H04R 7/16* (2013.01); *H04R 9/025* (2013.01); *H04R 9/06* (2013.01); *H04R 2460/13* (2013.01)

(58) Field of Classification Search
CPC ................ H04R 2460/11; H04R 17/00; H04R 2201/10; H04R 3/00; H04R 1/02; H04R 9/025; H04R 1/00; H04R 1/023; H04R 9/06; H04R 1/025; H04R 2400/03; H04R 1/021
See application file for complete search history.

(56) References Cited

U.S. PATENT DOCUMENTS

| | | | | |
|---|---|---|---|---|
| 2017/0026751 | A1 | 1/2017 | Suzuki et al. | |
| 2017/0188126 | A1* | 6/2017 | Hirano | A61B 5/6898 |
| 2018/0064374 | A1* | 3/2018 | Givens | G16H 40/63 |
| 2018/0160209 | A1* | 6/2018 | Ogata | H04R 1/288 |
| 2019/0075389 | A1 | 3/2019 | Jan | |
| 2019/0104352 | A1 | 4/2019 | Ozawa et al. | |
| 2019/0342647 | A1 | 11/2019 | Mehra et al. | |
| 2020/0344542 | A1 | 10/2020 | Liu et al. | |

FOREIGN PATENT DOCUMENTS

| | | | | |
|---|---|---|---|---|
| CN | 202721792 | U | 2/2013 | |
| CN | 204031403 | U | 12/2014 | |
| CN | 107948881 | A | 4/2018 | |
| CN | 207612396 | U | 7/2018 | |
| CN | 109547891 | A | 3/2019 | |
| CN | 110493679 | A | 11/2019 | |
| EP | 3125573 | A1 * | 2/2017 | H04R 1/00 |
| JP | 2003032768 | A | 1/2003 | |
| KR | 101937057 | B1 | 1/2019 | |

OTHER PUBLICATIONS

International Search Report in PCT/CN2020/128160 mailed on Jan. 27, 2021, 4 pages.
Written Opinion in PCT/CN2020/128160 mailed on Jan. 27, 2021, 4 pages.
The Second Examination Report in Australian Application No. 2020440893 mailed on Aug. 31, 2023, 4 pages.
The Extended European Search Report in European Application No. 20928540.2 mailed on Apr. 20, 2023, 7 pages.
Notice of Preliminary Rejection in Korean Application No. 10-2022-7033182 mailed on Nov. 20, 2024, 10 pages.

* cited by examiner

ACOUSTIC OUTPUT DEVICE

CROSS-REFERENCE TO RELATED APPLICATIONS

This application is a continuation of International Application No. PCT/CN2020/128160, filed on Nov. 11, 2020, which claims priority to Chinese Patent Application No. 202010247338.2, filed on Mar. 31, 2020, the contents of which are hereby incorporated by reference.

TECHNICAL FIELD

The present disclosure generally relates to an acoustic output device, and more particularly, relates to an acoustic output device using both bone conduction and air conduction to provide audio signals to the user.

BACKGROUND

Nowadays, wearable acoustic output devices (e.g., headsets) are emerging and become more and more popular. An open binaural acoustic output device (e.g., a bone conduction speaker) is a portable audio device that facilitates sound conduction to a user. However, the bone conduction speaker has a poor performance in a mid-low frequency range and brings about strong vibrations, thus affecting user experiences, especially the comfortability of the user. Therefore, it is desirable to develop an acoustic output apparatus that enhances an audio experience of the user at the mid-low frequency range.

SUMMARY

In an aspect of the present disclosure, an acoustic output device is provided. The acoustic output device may comprise a bone conduction speaker configured to generate bone conduction acoustic waves; an air conduction speaker configured to generate air conduction acoustic waves, the air conduction speaker being independent of the bone conduction speaker; and at least one housing configured to accommodate the bone conduction speaker and the air conduction speaker.

In some embodiments, the bone conduction speaker includes a vibrating assembly, the vibration assembly including a magnetic circuit system configured to generate a magnetic field; a vibrating plate connected to the at least one housing; and one or more coils connected to the vibrating plate, wherein the one or more coils vibrate in the magnetic field, and drive the vibrating plate to vibrate to generate the bone conduction acoustic waves.

In some embodiments, the air conduction speaker includes a driver and a vibrating diaphragm, wherein the driver drives the vibrating diaphragm to vibrate to generate the air conduction acoustic waves.

In some embodiments, the air conduction speaker is arranged alongside the bone conduction speaker.

In some embodiments, the at least one housing includes a first housing and a second housing, the bone conduction speaker is accommodated in the first housing, and the air conduction speaker is accommodated in the second housing.

In some embodiments, a vibration direction of the bone conduction speaker is in a first direction, a central vibration direction of a diaphragm of the air conduction speaker is in a second direction, and the first direction is parallel to the second direction.

In some embodiments, a distance from the air conduction speaker to a listening position is smaller than a distance from the bone conduction speaker to the listening position.

In some embodiments, the second housing includes a sound hole facing towards a listening position.

In some embodiments, the air conduction speaker and the bone conduction speaker are in a stacked arrangement.

In some embodiments, a vibration direction of the bone conduction speaker and a central vibration direction of a diaphragm of the air conduction speaker are in a same direction.

In some embodiments, the at least one housing includes a third housing, the bone conduction speaker and the air conduction speaker are accommodated in the third housing.

In some embodiments, the third housing includes a wall for transferring the bone conduction acoustic waves outwards.

In some embodiments, the third housing includes a sound hole facing towards a listening position.

In some embodiments, the bone conduction speaker and the air conduction speaker are vertically arranged.

In some embodiments, a vibration direction of the bone conduction speaker is in a third direction, a central vibration direction of a diaphragm of the air conduction speaker is in a fourth direction, and the third direction is substantially perpendicular to the fourth direction.

In some embodiments, the at least one housing includes a fourth housing, the bone conduction speaker and the air conduction speaker are accommodated in the fourth housing.

In some embodiments, the bone conduction acoustic waves include mid-high frequencies, and the air conduction acoustic waves include mid-low frequencies.

In some embodiments, the bone conduction acoustic waves include mid-low frequencies, and the air conduction acoustic waves include mid-high frequencies.

In some embodiments, the air conduction acoustic waves include mid-low frequencies, and the bone conduction acoustic waves include frequencies in a wider frequency range than the frequencies of the air conduction acoustic waves.

In some embodiments, the bone conduction acoustic waves include mid-low frequencies, and the air conduction acoustic waves include frequencies in a wider frequency range than the frequencies of the bone conduction acoustic waves.

In some embodiments, the air conduction acoustic waves include mid-high frequencies, and the bone conduction acoustic waves include frequencies in a wider frequency range than the frequencies of the air conduction acoustic waves.

In some embodiments, the bone conduction acoustic waves include mid-high frequencies, and the air conduction acoustic waves include frequencies in a wider frequency range than the frequencies of the bone conduction acoustic waves.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
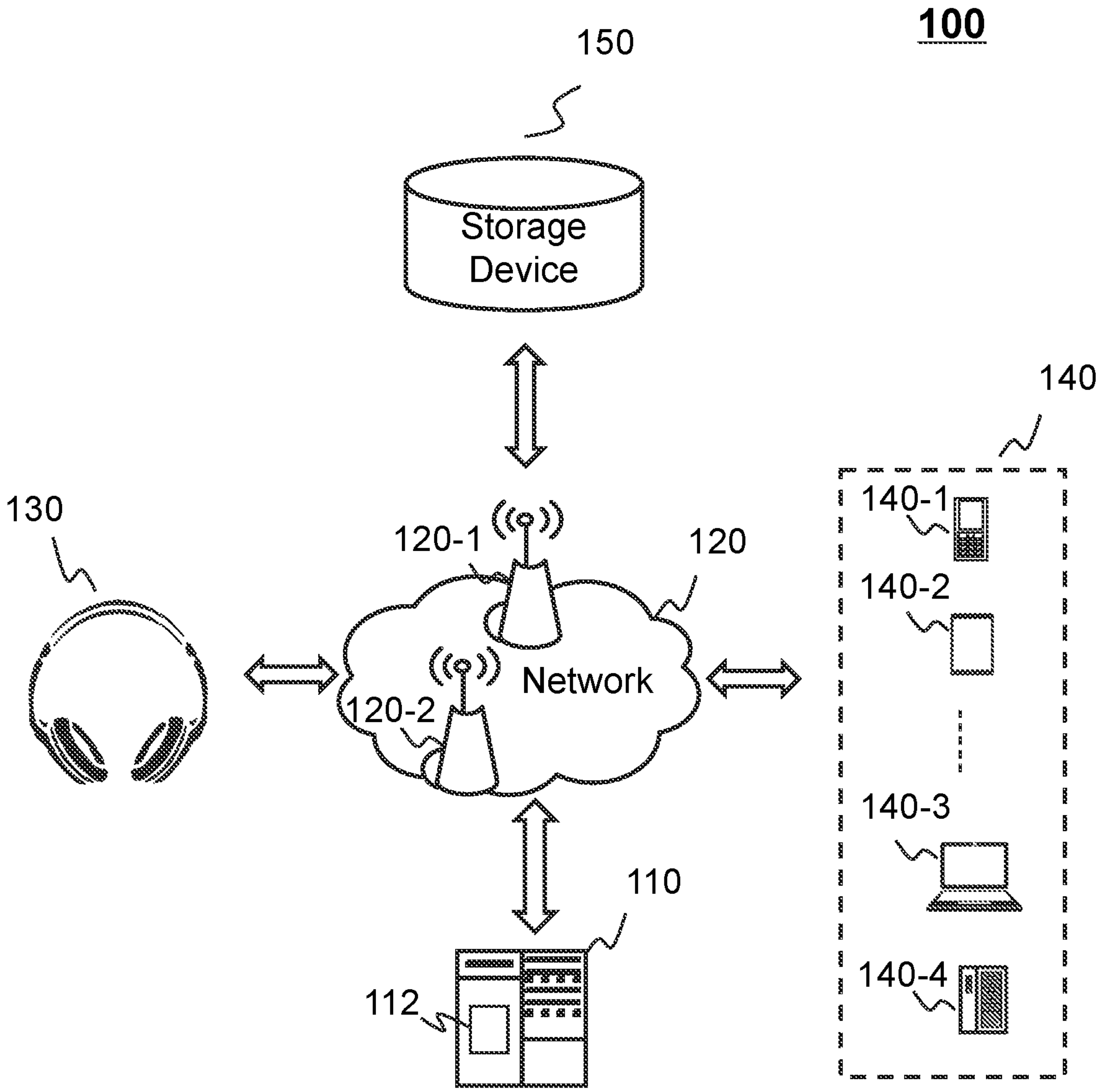
FIG. 1 is a schematic diagram illustrating an exemplary acoustic system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms “a,” “an,” and “the” may be intended to include the plural forms as well, unless the context clearly indicates otherwise. It will be further understood that the terms “comprise,” “comprises,” and/or “comprising,” “include,” “includes,” and/or “including,” when used in this disclosure, specify the presence of stated features, integers, operations, elements, and/or components, but do not preclude the presence or addition of one or more other features, integers, operations, elements, components, and/or groups thereof.

It will be understood that the term “system,” “engine,” “unit,” “module,” and/or “block” used herein are one method to distinguish different components, elements, parts, sections or assembly of different levels in ascending order. However, the terms may be displaced by another expression if they achieve the same purpose.

Generally, the word “module,” “unit,” or “block,” as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on processing devices (e.g., processor 220 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing processing device, for execution by the processing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or processing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being “on,” “connected to,” or “coupled to,” another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

An aspect of the present disclosure relates to an acoustic output device. The acoustic output device may include a bone conduction speaker (also referred to as a vibration speaker), an air conduction speaker, and at least one housing configured to accommodate the bone conduction speak and the air conduction speaker. The air conduction speaker is independent of the bone conduction speaker. Various spatial arrangements and/or frequency distributions of the bone conduction speak and the air conduction speaker may be provided so as to enhance an audio experience of a user of the acoustic output device at low frequencies and reduce a sound leakage of the acoustic output device.

FIG. 1 is a schematic diagram illustrating an exemplary acoustic system according to some embodiments of the present disclosure. The acoustic system 100 may include a multimedia platform 110, a network 120, an acoustic output device 130, a terminal device 140, and a storage device 150.

The multimedia platform 110 may communicate with one or more components of the acoustic system 100 or an external data source (e.g., a cloud data center). In some embodiments, the multimedia platform 110 may provide data or signals (e.g., audio data of a piece of music) for the acoustic output device 130 and/or the user terminal 140. In some embodiments, the multimedia platform 110 may facilitate data/signal processing for the acoustic output device 130 and/or the user terminal 140. In some embodiments, the multimedia platform 110 may be implemented on a single server or a server group. The server group may be a centralized server group connected to the network 120 via an access point, or a distributed server group connected to the network 120 via one or more access points, respectively. In some embodiments, the multimedia platform 110 may be locally connected to the network 120 or in remote connection with the network 120. For example, the multimedia platform 110 may access information and/or data stored in the acoustic output device 130, the user terminal 140, and/or the storage device 150 via the network 120. As another example, the storage device 150 may serve as backend data storage of the multimedia platform 110. In some embodiments, the multimedia platform 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the multimedia platform 110 may include a processing device 112. The processing device 112 may perform main functions of the multimedia platform 110. For example, the processing device 112 may retrieve audio data from the storage device 150, and transmit the retrieved audio data to the acoustic output device 130 and/or the user terminal 140 to generate sounds. As another example, the processing device 112 may process signals (e.g., generating a bone conduction control signal) for the acoustic output device 130.

In some embodiments, the processing device 112 may include one or more processing units (e.g., single-core processing device(s) or multi-core processing device(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a micro-controller unit, a reduced instruction-set computer (RISC), a microprocessor, or the like, or any combination thereof.

The network 120 may facilitate exchange of information and/or data. In some embodiments, one or more components in the acoustic system 100 (e.g., the multimedia platform 110, the acoustic output device 130, the user terminal 140, the storage device 150) may send information and/or data to other component(s) in the acoustic system 100 via the network 120. In some embodiments, the network 120 may be any type of wired or wireless network, or combination thereof. Merely by way of example, the network 120 may include a cable network, a wireline network, an optical fiber network, a tele-communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the acoustic system 100 may be connected to the network 120 to exchange data and/or information.

The acoustic output device 130 may output acoustic sounds to a user and interact with the user. In one aspect, the acoustic output device 130 may provide the user with at least audio contents, such as songs, poems, news broadcasting, weather broadcasting, audio lessons, etc. In another aspect, the user may provide feedback to the acoustic output device 130 via, for example, keys, screen touch, body motions, voice, gestures, thoughts, etc. In some embodiments, the acoustic output device 130 may be a wearable device. Unless specified, otherwise, the wearable device as used herein may include headphones and various other types of personal devices such as head, shoulder, or body-worn devices. The wearable device may present at least audio contents to the user with or without contacting the user. In some embodiments, the wearable device may include a smart headset, a smart glass, a head mountable display (HMD), a smart bracelet, a smart footgear, a smart glass, a smart helmet, a smart watch, smart clothing, a smart backpack, a smart accessory, a virtual reality helmet, a virtual reality glass, a virtual reality patch, an augmented reality helmet, an augmented reality glass, an augmented reality patch, or the like, or any combination thereof. Merely by ways of example, the wearable device may be like a Google Glass™, an Oculus Rift™, a Hololens™, a Gear VR™, etc.

The acoustic output device 130 may communicate with the user terminal 140 via the network 120. In some embodiments, various types of data and/or information including, for example, motion parameters (e.g., a geographic location, a moving direction, a moving velocity, an acceleration, etc.), voice parameters (a volume of the voice, content of the voice, etc.), gestures (e.g., a handshake, shaking head, etc.), thoughts of the user, etc., may be received by the acoustic output device 130. In some embodiments, the acoustic output device 130 may further transmit the received data and/or information to the multimedia platform 110 or the user terminal 140.

In some embodiments, the user terminal 140 may be customized, e.g., via an application installed therein, to communicate with and/or implement data/signals processing for the acoustic output device 130. The user terminal 140 may include a mobile device 130-1, a tablet computer 130-2, a laptop computer 130-3, a built-in device in a vehicle 130-4, or the like, or any combination thereof. In some embodiments, the mobile device 130-1 may include a smart home device, a smart mobile device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, a built-in device in the vehicle 130-4 may include a built-in computer, an onboard built-in television, a built-in tablet, etc. In some embodiments, the user terminal 140 may include a signal transmitter and a signal receiver configured to communicate with a positioning device (not shown in the figure) for locating the position of the user and/or the user terminal 140. In some embodiments, the multimedia platform 110 or the storage device 150 may be integrated into the user terminal 140. In such a case, the functions that can be achieved by the multimedia platform 110 described above may be similarly achieved by the user terminal 140.

The storage device 150 may store data and/or instructions. In some embodiments, the storage device 150 may store data obtained from the multimedia platform 110, the acoustic output device 130 and/or the user terminal 140. In some embodiments, the storage device 150 may store data and/or instructions that the multimedia platform 110, the acoustic output device 130 and/or the user terminal 140 may implement various functions. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, one or more components in the acoustic system 100 may access the data or instructions stored in the storage device 150 via the network 120. In some embodiments, the storage device 150 may be directly connected to the multimedia platform 110 as a backend storage.

In some embodiments, the multimedia platform 110, the terminal device 140, and/or the storage device 150 may be integrated onto the acoustic output device 130. Specifically, as technology advances and the processing capability of the acoustic output device 130 improves, all the processing may be performed by the acoustic output device 130. For example, the acoustic output device 130 may be a smart headset, an MP3 player, a hearing-aids, etc., with highly integrated electronic components, such as central processing units (CPUs), graphics processing units (GPUs), etc., thus having a strong processing capability.

Figure 2A:
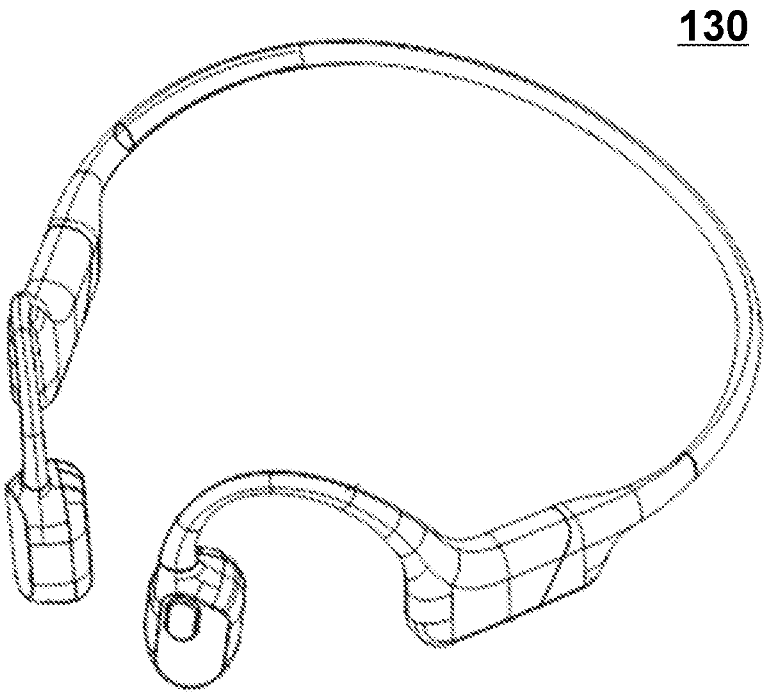
FIGS. 2A and 2B are schematic diagrams of an exemplary acoustic output device according to some embodiments of the present disclosure.
Figure 2B:
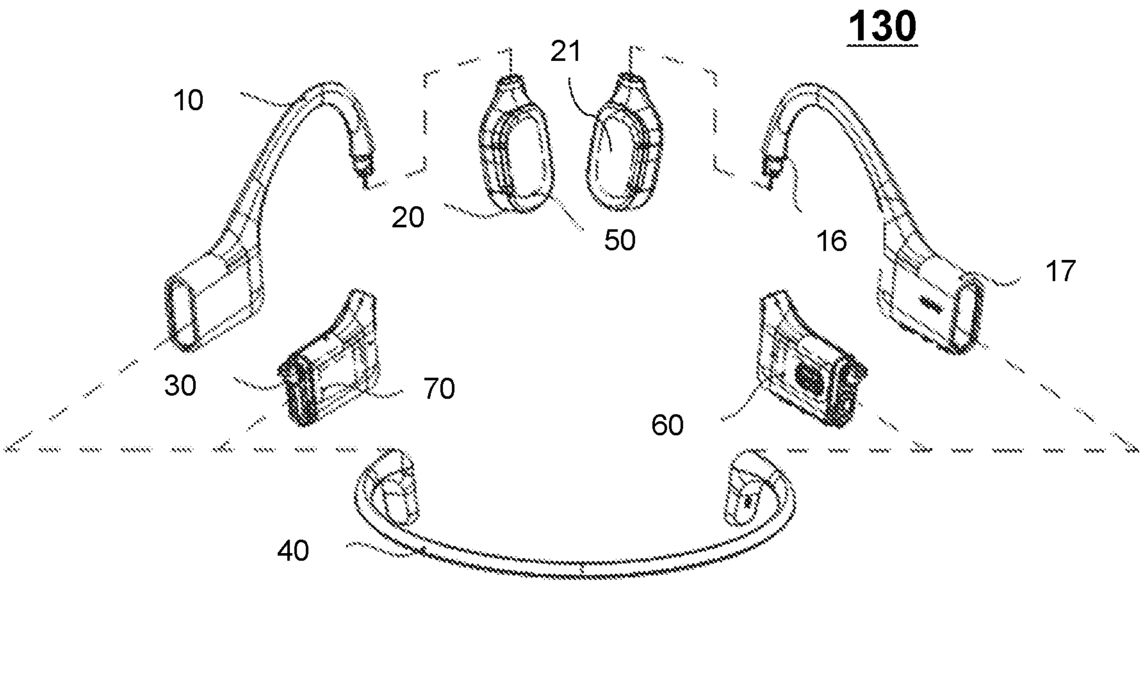

FIGS. 2A and 2B are schematic diagrams of an exemplary acoustic output device according to some embodiments of the present disclosure. FIG. 2A illustrates an oblique view of the acoustic output device 130. FIG. 2B illustrates an exploded view of the acoustic output device 130. The acoustic output device 130 may be described in combination with FIGS. 2A and 2B.

In some embodiments, the acoustic output device 130 may include ear hooks 10, earphone core housings 20, a circuit housing 30, rear hooks 40, earphone cores 50, a control circuit 60, and a battery 70. The earphone core housings 20 and the circuit housing 30 may be set at both ends of the ear hooks 10, respectively, and the rear hooks 40 may further be set at an end of the circuit housing 30 away from the ear hooks 10. The earphone core housings 20 may be used to accommodate different earphone cores. The circuit housing 30 may be used to accommodate the control circuit 60 and the battery 70. Two ends of the rear hooks 40 may be connected to the corresponding circuit housing 30, respectively. The ear hooks 10 may refer to structures configured to hang the acoustic output device 130 on the user's ears when the user wears the acoustic output device 130, and fix the earphone core housings 20 and earphone cores 50 at predetermined positions relative to the user's ears.

In some embodiments, the ear hooks 10 may include an elastic metal wire. The elastic metal wire may be configured to keep the ear hooks 10 in a shape which matches the ears of the user with a certain elasticity, so that a certain elastic deformation may occur according to the ear shape and the head shape of the user when the user wears the acoustic output device 130, thus adapting to users with different ear shapes and head shapes. In some embodiments, the elastic metal wire may be made of a memory alloy with a good deformation recovery ability. Even if the ear hooks 10 are deformed due to an external force, it may recover to its original shape when the external force is removed, thereby extending the lifetime of the acoustic output device 130. In some embodiments, the elastic wire may also be made of a non-memory alloy. A lead may be provided in the elastic metal wire so as to establish an electrical connection between the earphone cores 50 and other components, such as the control circuit 60, the battery 70, etc., so as to facilitate power supply and data transmission for the earphone cores 50. In some embodiments, the ear hooks 10 may further include a protection sleeve 16 and a housing protector 17 integrally formed with the protection sleeve 16.

In some embodiments, the earphone core housings 20 may be configured to accommodate the earphone cores 50. The earphone cores 50 may include one or more speakers. The one or more speakers may include a bone conduction speaker, an air conduction speaker, etc. The bone conduction speaker may be configured to output acoustic waves conducted through a solid medium (e.g., bones). For example, the bone conduction speaker may convert an electric signal to vibrations in a cranial bone of a user via direct contact with the user. The air conduction speaker may be configured to output acoustic waves conducted through air. For example, the air conduction speaker may convert another electric signal to air vibrations detectable by an ear of the user. The number of both the earphone cores 50 and the earphone core housings 20 may be two, which may correspond to the left and right ears of the user, respectively. Details regarding the earphone cores 50 can be found elsewhere in the present disclosure, for example, FIGS. 3-15.

In some embodiments, the ear hooks 10 and the earphone core housings 20 may be separately molded, and further assembled together instead of directly molding the both together.

In some embodiments, the earphone core housings 20 may be provided with a contact surface 21. The contact surface 21 may be in contact with the skin of the user. Bone conduction acoustic waves generated by one or more bone conduction speakers of the earphone cores 50 may be transferred outside of the earphone core housings 20 (e.g., to an eardrum of the user) through the contact surface during the operation of the acoustic output device 130. In some embodiments, the material and thickness of the contact surface 21 may affect the transmission of the bone conduction acoustic waves to the user, thereby affecting the sound quality. For example, if the material of the contact surface 21 is relatively soft, the transmission of the bone conduction acoustic waves in a low frequency range may be better than the transmission of the bone conduction acoustic waves in a high frequency range. On the contrary, if the material of the contact surface 21 is relatively hard, the transmission of the bone conduction acoustic waves in the high frequency range may be better than the transmission of the bone conduction acoustic waves in the low frequency range.

Figure 3A:
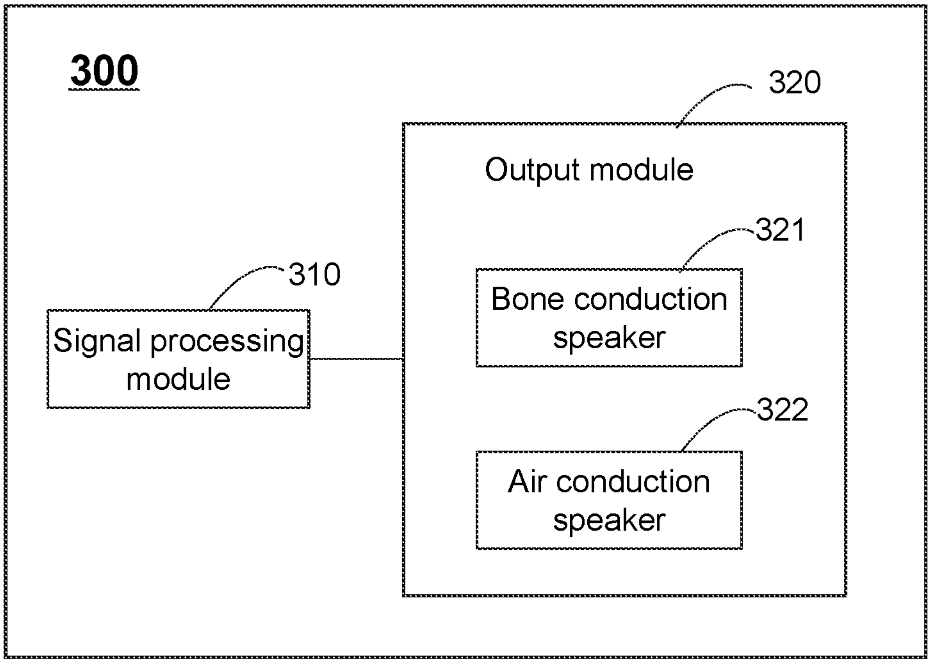
FIG. 3A is a schematic diagram of an exemplary acoustic output device according to some embodiments of the present disclosure.

FIG. 3A is a schematic diagram of an exemplary acoustic output device according to some embodiments of the present disclosure. As shown in FIG. 3A, the acoustic output device 300 may include a signal processing module 310 and an output module 320. The signal processing module 310 may receive electric signals from a signal source, and process the electric signals. In some embodiments, the electric signals may be analog signals or digital signals. For example, the electric signals may be digital signals obtained from the multimedia platform 110, the terminal device 140, the storage device 150, etc.

The signal processing module 310 may process the electric signals. For example, the signal processing module 310 may process the electric signals by performing various signal processing operations, such as sampling, digitalization, compression, frequency division, frequency modulation, encoding, or the like, or a combination thereof. The signal processing module 310 may further generate control signals based on processed electric signals.

The output module 320 may generate and output bone conduction acoustic waves (also referred to as bone conduction sounds) and/or air conduction acoustic waves (also referred to as air conduction sounds). The output module 320 may receive the control signals from the signal processing module 310, and generate the bone conduction acoustic waves and/or the air conduction acoustic waves based on the control signals. As used herein, the bone conduction acoustic waves refer to the acoustic waves conducted in the form of mechanical vibrations through a solid medium (e.g., bones). The air conduction acoustic waves refer to acoustic waves conducted in the form of mechanical vibrations through the air.

For illustration purposes, the output module 320 may include a bone conduction speaker (also referred to as a vibration speaker) 321 and an air conduction speaker 322. The bone conduction speaker 321 and the air conduction speaker 322 may be electrically coupled to the signal processing module 310. The bone conduction speaker 321 may generate the bone conduction acoustic waves in a particular frequency range (e.g., a low frequency range, a medium frequency range, a high frequency range, a mid-low frequency range, a mid-high frequency range, etc.) according to the control signals generated by the signal processing module 310. The air conduction speaker 322 may generate the air conduction acoustic waves in a same or different frequency ranges as the bone conduction speaker 321 according to the control signals generated by the signal processing module 310. In some embodiments, the bone conduction speaker 321 and the air conduction speaker 322 may be two independent functional devices, or two independent components of a single device. As used herein, that a first device is independent of a second device represents that the operation of the first/second device is not caused by the operation of the second/first device, or in other words, the operation of the first/second device is not a result of the operation of the second/first device. Taking the bone conduction speaker and the air conduction speaker as examples, the air conduction speaker is independent of the bone conduction speaker because each of the two speakers is driven independently to generate the acoustic waves by an electric signal.

Different frequency ranges may be determined according to actual needs. For example, the low frequency range (also referred to as low frequencies) may refer to a frequency range from 20 Hz to 150 Hz, the medium frequency range (also referred to as medium frequencies) may refer to a frequency range from 150 Hz to 5 kHz, the high frequency range (also referred to as high frequencies) may refer to a frequency range from 5 kHz to 20 kHz, the mid-low frequency range (also referred to as mid-low frequencies) may refer to a frequency range from 150 Hz to 500 Hz, and the mid-high frequency range (also referred to as mid-high frequencies) may refer to a frequency range from 500 Hz to 5 kHz. As another example, the low frequency range may refer to a frequency range from 20 Hz to 300 Hz, the medium frequency range may refer to a frequency range from 300 Hz to 3 kHz, the high frequency range may refer to a frequency range from 3 kHz to 20 kHz, the mid-low frequency range may refer to a frequency range from 100 Hz to 1000 Hz, and the mid-high frequency range may refer to a frequency range from 1000 Hz to 10 kHz. It should be noted that the values of the frequency ranges are merely provided for illustration purposes, and not intended to be limiting. Definitions of the above frequency ranges may vary according to different application scenarios and different classification standards. For example, in some other application scenarios, the low frequency range may refer to a frequency range from 20 Hz to 80 Hz, the medium frequency range may refer to a frequency range from 160 Hz to 1280 Hz, the high frequency range may refer to a frequency range from 2560 Hz to 20 kHz, the mid-low frequency range may refer to a frequency range from 80 Hz-160 Hz, and the mid-high frequency range may refer to a frequency range from 1280 Hz-2560 Hz. Optionally, different frequency ranges may have or not have overlapping frequencies.

Figure 3B:
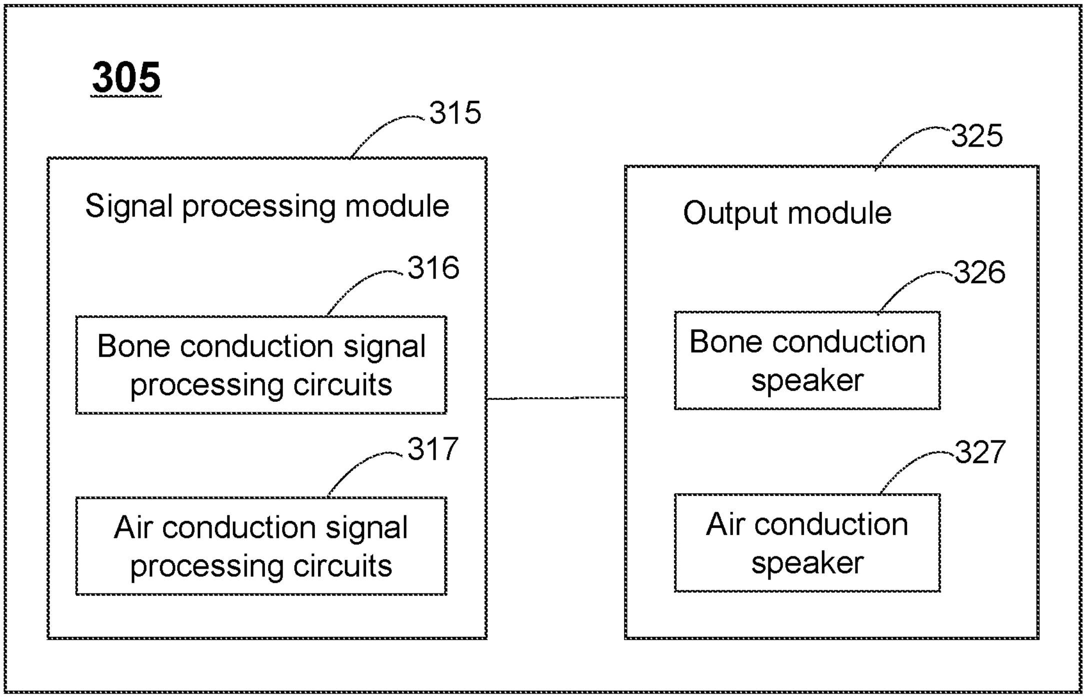
FIG. 3B is a schematic diagram of another exemplary acoustic output device according to some embodiments of the present disclosure.

FIG. 3B is a schematic diagram of another exemplary acoustic output device according to some embodiments of the present disclosure. In some embodiments, the acoustic output device 305 as illustrated in FIG. 3B may be similar to or the same as the acoustic output device 300 as illustrated in FIG. 3A, except that the acoustic output device 305 may further include bone conduction signal processing circuits 316 and air conduction signal processing circuits 317. The bone conduction signal processing circuits 316 may be configured to process bone conduction signals. The air conduction signal processing circuits 317 may be configured to process air conduction signals. In some embodiments, the electric signals may include bone conduction signals and air conduction signals. As used herein, the bone conduction signals refer to electric signals that relate to the bone conduction acoustic waves and/or electric signals that have impact on the generation and output of the bone conduction acoustic waves. The air conduction signals refer to electric signals that relate to the air conduction acoustic waves and/or electric signals that have impact on the generation and output of the air conduction acoustic waves. In some embodiments, the bone conduction signal processing circuit 316 may receive bone conduction signals from the signal source, process the bone conduction signals, and generate a corresponding bone conduction control signal. The bone conduction control signal refers to a signal that controls the generation and output of the bone conduction acoustic waves. Similarly, the air conduction signal processing circuit 317 may receive air conduction signals from the signal source, process the air conduction signals, and generate a corresponding air conduction control signal. The air conduction control signal refers to a signal that controls the generation and output of the air conduction acoustic waves.

The output module 325 may also include a bone conduction speaker 326 and an air conduction speaker 327. The bone conduction speaker 326 and the air conduction speaker 327 may be the same as or similar to the bone conduction speaker 321 and an air conduction speaker 322 of the output module 320 in FIG. 3A, respectively, which may not be repeated here. The bone conduction speaker 326 may be electrically coupled to the bone conduction signal processing circuit 316. And the bone conduction speaker 326 may generate and output bone conduction acoustic waves in a particular frequency range according to the bone conduction control signals generated by the bone conduction signal processing circuits 316. The air conduction speaker 327 may be electrically coupled to the air conduction signal processing circuit 317. And the bone conduction speaker 327 may generate and output air conduction acoustic waves in a same or different frequency ranges as the bone conduction speaker 326 according to the air conduction control signals generated by the air conduction signal processing circuits 317.

In some embodiments, the bone conduction signal processing circuits 316 may be integrated with the bone conduction speaker 326 or disposed within a same housing. Similarly, the air conduction signal processing circuits 317 may be integrated with the air conduction speaker 327 or disposed within a same housing.

In combination with FIG. 3A and FIG. 3B, in order to adjust output characteristics (e.g., a frequency, a phase, an amplitude, etc.) of the bone conduction acoustic waves and/or the air conduction acoustic waves, the bone conduction control signals and/or the air conduction control signals may be further processed in the signal processing module 310 or 315, such that the bone conduction acoustic waves and/or the air conduction acoustic waves may have different output characteristics. For example, the bone conduction control signals and/or the air conduction control signals may include specific frequencies. In some alternative embodiments, a structure of each of at least one component and/or an arrangement of at least one component within the output module 320 or 325 may be modified or optimized so that the output characteristics (e.g., frequencies) of the bone conduction acoustic waves and/or the air conduction acoustic waves may be adjusted.

In some embodiments, one or more filters or filter sets may be provided to process the bone conduction control signals and/or the air conduction control signals in the signal processing module 310 or 315 so as to adjust output characteristics (e.g., frequencies) of the bone conduction acoustic waves and/or the air conduction acoustic waves. Exemplary filters or filter sets may include but are not limited to, analog filters, digital filters, passive filters, active filters, or the like, or a combination thereof.

In some embodiments, a time-domain processing method may be provided to enrich the acoustic effect of the sounds output by the output module 320 or 325. Exemplary time-domain processing methods may include a dynamic range control (DRC), a time delay, and reverberation, etc.

In some embodiments, the acoustic output device 300 or 305 may also include an active leakage reduction module. In some embodiments, the active leakage reduction module may output acoustic waves directly without feedback from a reference (e.g., a microphone) to superimpose and cancel leaked sound waves (i.e., sound leakage) of the acoustic output device 300 or 305. The acoustic waves output from the active leakage reduction module may have the same amplitudes, the same frequencies, and inversed phases relative to leaked sound waves. In some alternative embodiments, the active leakage reduction module may output acoustic waves according to a feedback from a reference. For example, a microphone may be placed in a sound field of the acoustic output device 300 or 305 to obtain information of the sound field (e.g., a position, a frequency, a phase, an amplitude, etc.), and provide real-time feedback to the active leakage reduction module to adjust the output acoustic waves dynamically so as to reduce or eliminate the sound leakage of the acoustic output device 300 or 305. In some embodiments, the active leakage reduction module may be incorporated in the output module 320 or 325.

In some embodiments, the acoustic output device 300 or 305 may further include a beam forming module. The beam forming module may be configured to form a certain sound beam of the bone conduction acoustic waves and/or the air conduction acoustic waves. In some embodiments, the beam forming module may form the certain sound beam by controlling amplitudes and/or phases of the bone conduction acoustic waves and/or the air conduction acoustic waves propagated from the output module 320 (e.g., the bone conduction speaker 321 and an air conduction speaker 322) or the output module 325 (e.g., the bone conduction speaker 326 and an air conduction speaker 327). The sound beam may be, for example, a fan-shaped beam with a certain angle. The sound beam may propagate in a particular direction so as to achieve a maximum sound pressure level near human ears. At the same time, the sound pressure level at other positions in the sound field may be relatively small, thereby reducing sound leakage of the acoustic output device 300 or 305. In some embodiments, the acoustic output device 300 or 305 may produce a more ideal three-dimensional sound field using 3D sound field reconstruction techniques or local sound field control techniques, so that the user may obtain a better immersive experience in the sound field. In some embodiments, the beam forming module may also be incorporated in the output module 320 or 325.

Figure 4:
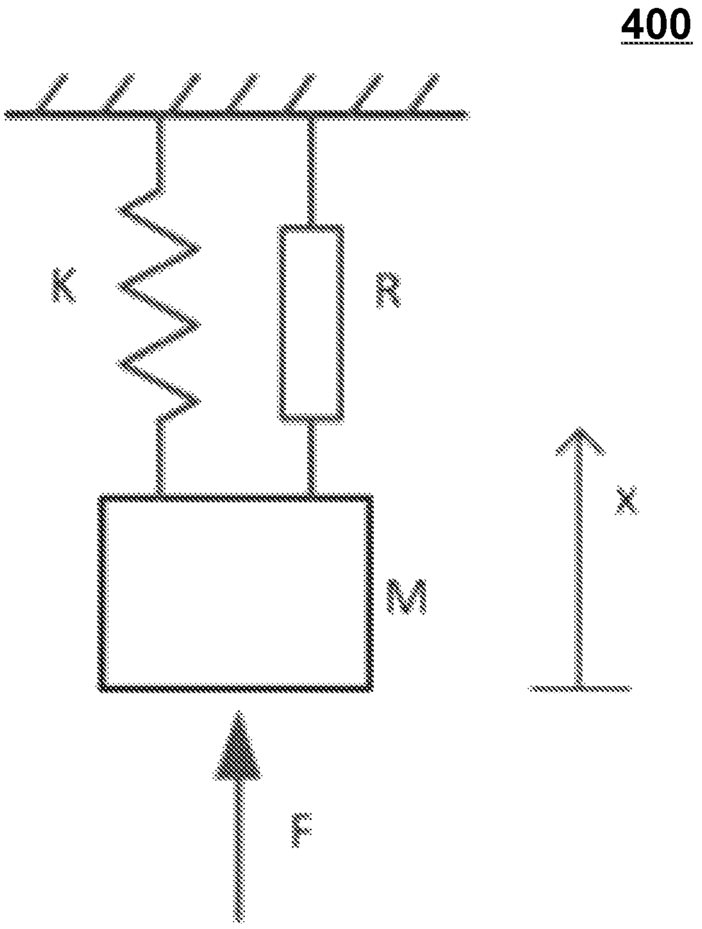
FIG. 4 is a schematic diagram of a resonance system according to some embodiments of the present disclosure.

FIG. 4 is a schematic diagram of a resonance system according to some embodiments of the present disclosure. In some embodiments, effects of structures and/or arrangements of one or more components of the acoustic output device 130 on the characteristics of the acoustic sounds output by the acoustic output device 130 may be modeled using the resonance system 400. In some embodiments, the resonance system 400 may be describe in combination with a mass spring damping system. In some embodiments, the resonance system 400 may be describe in combination with a plurality of mass spring damping systems connected in parallel or in series. A motion of the resonance system 400 may be expressed in Equation (1):

$$M\frac{d^2x}{dt^2}+R\frac{dx}{dt}+Kx=F, \tag{1}$$

where M denotes mass of the resonance system 400, R denotes damping of the resonance system 400, K denotes an elastic coefficient of the resonance system 400, F denotes a driving force, and x denotes a displacement of the resonance system 400.

In some embodiments, a resonance frequency of the resonance system 400 may be obtained by solving Equation (1). The resonance frequency of the resonance system 400 may be obtained according to Equation (2):

$$f_0=\frac{1}{2\pi}\sqrt{\frac{K}{M}}, \tag{2}$$

were $f_0$ denotes the resonance frequency of the resonance system 400.

In some embodiments, a frequency bandwidth may be determined according to a half-power point. A quality factor Q of the resonance system 400 may be determined according to Equation (3):

$$Q=\frac{\sqrt{MK}}{R}. \tag{3}$$

In cases of a plurality of resonance systems, vibration characteristics (e.g., an amplitude-frequency response, a phase-frequency response, a transient response, etc.) of each of the plurality of resonance systems may be the same or different. For example, each of the plurality of resonance systems may be driven by a same driving force, or different driving forces.

In some embodiments, each of the bone conduction speaker 321, the air conduction speaker 322, the bone conduction speaker 326, or the air conduction speaker 327 may be a single resonance system or a combination of a plurality of resonance systems. In some embodiments, the output module 320 or 325 may also include a plurality of bone conduction speakers and/or a plurality of air conduction speakers.

As for the bone conduction acoustic waves, frequencies and bandwidths of the bone conduction acoustic waves may be adjusted by changing the parameters exemplified above (e.g., the mass, the damping, etc.). For example, the resonance frequency may be adjusted into a mid-low frequency range by increasing the mass, reducing the elastic coefficient (e.g., using a spring with a lower elastic coefficient, using a material with a lower Young's modulus as a vibration transferring structure, reducing a thickness of a vibration transferring structure, etc.). In this case, the resonance system 400 (e.g., the bone conduction speaker) may output vibrations in the mid-low frequency range. As another example, the resonance frequency may be adjusted into a mid-high frequency band by reducing the mass of the resonance system 400, increasing the elastic coefficient of the resonance system 400 (using a spring with a higher elastic coefficient, using a material with a higher Young's modulus as the vibration transferring structure, increasing the thickness of the vibration transferring structure, etc., setting ribs or other enforcement structures to the vibration transferring structure, etc.). In this case, the resonance system 400 may output vibrations in the mid-high frequency range. As a further example, the bandwidth of the vibrations output by resonance system 400 be adjusted by changing the quality factor Q. As a further example, a composite resonance system including a plurality of resonance systems may be provided. The resonant frequency and quality factor Q of each resonance system may be adjusted separately. A center frequency and a bandwidth of the composite resonance system may be adjusted by connecting the plurality of resonance systems in series or in parallel.

As for air conduction acoustic waves, frequencies and bandwidths of the air conduction acoustic waves may be adjusted by changing the parameters exemplified above (e.g., the mass, the damping, etc.) similarly. In some embodiments, one or more acoustic structures may be provided to adjust the frequencies of the air conduction acoustic waves. The one or more acoustic structures may include, for example, an acoustic cavity, a sound tube, a sound hole, a decompression hole, a tuning net, tuning cotton, a passive diaphragm, or the like, or a combination thereof. For example, the elastic coefficient of the system 400 may be adjusted by changing a volume of the acoustic cavity. If the volume of the acoustic cavity is enlarged, the elastic coefficient of the system may be smaller. If the volume of the acoustic cavity is decreased, the elastic coefficient of the system may be larger. In some embodiments, the mass and damping of the system 400 may be adjusted by setting a sound tube or a sound hole. The longer the sound tube or the sound hole is, the smaller the cross-section will be, the greater the mass will be, and the smaller the damping will be. Conversely, the shorter the sound tube or the sound hole is, the greater the cross-section will be, the smaller the mass will be, and the greater the damping will be. In some embodiments, the damping of the system 400 may be adjusted by setting acoustic resistance materials (e.g., tuning holes, tuning nets, tuning cotton, etc.) on a path through which the air conduction acoustic waves propagate. In some embodiments, the air conduction acoustic waves in a low frequency range may be enhanced by setting a passive diaphragm. In some embodiments, the phases, amplitudes, and/or frequency ranges of the air conduction acoustic waves may be adjusted by setting one or more sound tubes and/or phase-inversion holes. In some other embodiments, an array of air conduction speakers may be provided. The amplitude, frequency range, and phase of each air conduction speaker may be adjusted to form a sound field with a particular spatial distribution.

In some embodiments, the output characteristics of the bone conduction acoustic waves and/or air conduction acoustic waves may also be adjusted by a user (e.g., by setting an amplitude, a frequency, and/or a phase of a control signal). In some embodiments, the output characteristics of the bone conduction acoustic waves and/or air conduction acoustic waves may also be adjusted via the parameters of the resonance system 400 and the control signal set by the user.

Figure 5A:
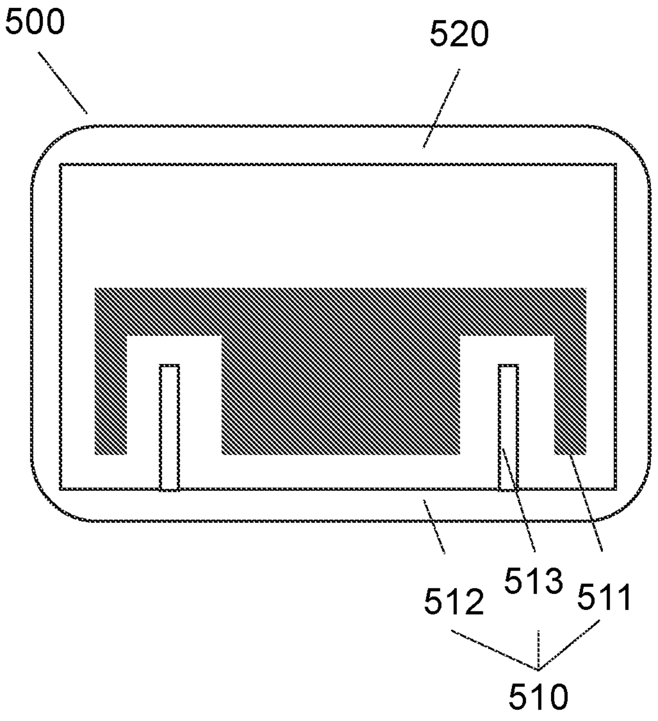
FIG. 5A is a schematic diagram of an exemplary bone conduction speaker according to some embodiments of the present disclosure.

FIG. 5A is a schematic diagram of an exemplary bone conduction speaker according to some embodiments of the present disclosure. The bone conduction speaker 500 may include a vibrating assembly 510. The vibrating assembly 510 may include or be accommodated in a housing 520. The vibrating assembly 510 may be electrically connected with the signal processing module 310 or 315 to receive the bone conduction control signals, and generate bone conduction acoustic waves based on the bone conduction control signals. For example, the vibrating assembly 510 may be or include any element (e.g., a vibrating motor, an electromagnetic vibrating device, etc.) that converts electric signals (e.g., the bone conduction control signals) into mechanical vibration signals. Exemplary signal conversion manners may include but not limited to, electromagnetic types (e.g., a moving coil type, a moving iron type, a magnetostrictive type), piezoelectric types, electrostatic types, etc. Internal structures of the vibrating assembly 510 may be a single resonance system or a composite resonance system. In some embodiments, the vibrating assembly 510 may generate mechanical vibrations according to the bone conduction control signals. The mechanical vibrations may generate the bone conduction acoustic waves.

As illustrated in FIG. 5A, the vibrating assembly 510 may include a magnetic circuit system 511, a vibrating plate 512, and one or more coils 513. The magnetic circuit system 511 may be configured to generate a magnetic field. In some embodiments, the magnetic circuit system 511 may include a magnetic gap. The magnetic circuit system 511 may generate the magnetic field in the magnetic gap. The vibrating plate 512 may be in contact with skin of a user (e.g., the skin on the head of the user), and transfer the bone conduction acoustic waves to a cochlea of the user when the user wears the acoustic output device 300 or 305. The vibrating plate 512 may also be referred to as a bottom wall of the housing 520. As used in the present disclosure, the "bottom" or "upper" portion of a component is described with respect to the skin of a user. For example, in the housing 520, the wall closest to the skin (e.g., the wall attached to the skin) of the user is called the bottom wall, and the wall most remote from the skin (e.g., the wall opposite to the bottom wall) of the user is called the upper wall. The one or more coils 513 may be mechanically connected to the vibration plate 512. In some embodiments, the one or more coils 513 may also be electrically connected to the signal processing module 310 or 315. In some embodiments, the one or more coils 513 may be placed in the magnetic gap. When a current is introduced into the one or more coils 513, the one or more coils 513 may vibrate in the magnetic field, and drive the vibration plate 512 to vibrate to generate the bone conduction acoustic waves.

Figure 5B:
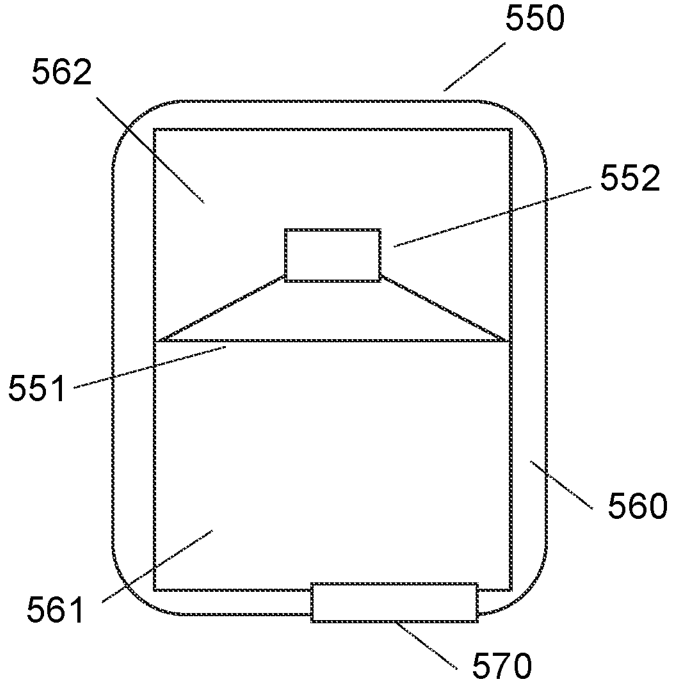
FIG. 5B is a schematic diagram of an exemplary air conduction speaker according to some embodiments of the present disclosure.

FIG. 5B is a schematic diagram of an exemplary air conduction speaker according to some embodiments of the present disclosure. In some embodiments, the air conduction speaker 550 may be a general purpose speaker that generates acoustic waves propagating through the air. In some embodiments, the air conduction speaker 550 may be a specially designed speaker that is customized to be in compliance with certain requirements (e.g., requirements on output characteristics). In some embodiments, the air conduction speaker 550 may include a diaphragm 551 and a driver 552. The diaphragm 551 may be a thin film made of materials being sensitive to variable magnetic fields. Exemplary materials of the diaphragm 551 may include polyarylester (PAR), thermoplastic elastomer (TPE), polytetrafluoroethylene (PTFE), etc. The driver 552 may be a moving-iron driver, a moving-coil driver, or the like, or a combination thereof. In some embodiments, the driver 552 may obtain the air conduction control signals from the signal processing module 310 or 315 (e.g., the air conduction signal processing circuits 317), and drives the diaphragm 551 to vibrate according to the air conduction control signals so as to generate the air conduction acoustic waves.

In some embodiments, the air conduction speaker 550 including the diaphragm 551 and the driver 552 may be accommodated in a housing 560. In some embodiments, the diaphragm 551 may have a large size such that a cavity of the housing 560 may be divided into two portions including a front portion 561 and a rear portion 562 by the diaphragm 551. The front portion 561 refers to the portion on a front side of the diaphragm 521 (e.g., a lower portion as shown in FIG. 5B), which can be referred to as the "front cavity". The rear portion 562 refers to the portion on a rear side of the diaphragm 521 (e.g., an upper portion as shown in FIG. 5B), which can be referred to as the "back cavity".

In some embodiments, at least one sound hole (e.g., a sound hole 570) may be set on a wall of the front cavity of the housing 560. A sound hole may be a through-hole. The air conduction acoustic waves generated in the front cavity of the housing 560 may propagate out of the housing 560 through the at least one sound hole. In some embodiments, when a user wears the acoustic output device 300 or 305, a sound hole may face towards an external auditory canal of the user.

In some embodiments, a sound tube (not shown) may be coupled to a sound hole. In some embodiments, the air conduction acoustic waves passing through the sound hole may enter the sound tube, and propagate along a particular direction via the sound tube. In this way, the sound tube may change the direction in which the air conduction acoustic waves propagate.

In some embodiments, a decompression hole (not shown) may be set on a wall of the back cavity of the housing 560. The decompression hole may be a through-hole that facilitates a pressure balance between the back cavity of the housing 560 and the outside. Further, the decompression hole may help adjust the frequency response of the air conduction speaker 550 in low frequencies.

In some embodiments, the air conduction acoustic waves may be transferred to the outside through the decompression hole, thus producing a sound leakage. In some embodiments, a specially designed decompression hole may reduce or suppress the sound leakage. For example, the decompression hole may have a larger size, so that a resonance peak (Helmholtz resonance) of the back cavity of the housing 560 may correspond to a higher frequency. In this way, the sound leakage of mid-low frequencies propagated out of the decompression hole may be suppressed. Further, the larger the size of the decompression hole is, the smaller the acoustic impedance may be, and the smaller sound pressure of the acoustic waves at the decompression hole may be, thus reducing the sound leakage.

In some further embodiments, a tuning net (not shown) may be provided at the decompression hole to reduce the intensity of the resonance peak, thereby reducing a frequency response of the back cavity of the housing 520 and suppressing the sound leakage.

In some embodiments, the output characteristics of the bone conduction acoustic waves may be adjusted by changing the stiffness of the vibrating plate 512 and/or the housing 520 (e.g., via sizes, material elastic modulus, ribs, and/or other mechanical structures of the vibrating plate 512 and/or the housing 520). In some embodiments, the output characteristics of the air conduction acoustic waves may be adjusted by changing a shape, an elastic coefficient, and damping of the diaphragm 521. In some embodiments, the output characteristics of the air conduction acoustic waves may also be adjusted by changing the number, position(s), size(s), and/or shape(s) of the at least one sound hole and/or the decompression holes. For example, a damping structure (for example, a tuning net) may be provided at the sound hole 570 to adjust the acoustic effect of the air conduction speaker 550.

It should be noted that the number, sizes, shapes (e.g., shapes of cross-sections), and/or locations of the one or more additional acoustic structures exemplified above (e.g., the sound hole, the sound tube, the decompression hole, and/or the tuning net) may be set according to actual needs and may not be limited in the present disclosure. In some embodiments, the number, the sizes, the shapes, and/or the locations of one or more additional acoustic structures may be optimized according to the sound leakage of the acoustic output device 300 or 305. In some embodiments, the optimization may be conducted according to leakage-frequency response curves provided below. Besides, spatial arrangements of the bone conduction speaker 500 and the air conduction speaker 550 and/or one or more components of the bone conduction speaker 500 and the air conduction speaker 550 may not be limited in the present disclosure. For example, a spatial arrangement of the bone conduction speaker 500 and the air conduction speaker 550 (e.g., the air conduction speaker 550 may be arranged alongside the bone conduction speaker 500, the air conduction speaker 550 and the bone conduction speaker 500 may be in a stacked arrangement, etc.) may vary according to actual needs, and may not be limited. As another example, a position of the driver 552 and/or the diaphragm 551 in the housing 560, an orientation (e.g., a direction of the front side) of the diaphragm 551, etc., may vary according to actual needs, and may not be limited.

The acoustic output device provided in the present disclosure may combine a bone conduction speaker (e.g., the bone conduction speaker 500) and an air conduction speaker (e.g., the air conduction speaker 550) to provide a user with better acoustic effects and tactile feelings. In some embodiments, the bone conduction acoustic waves and the air conduction acoustic waves output by the acoustic output device may include sound waves of different frequencies.

Figure 6:
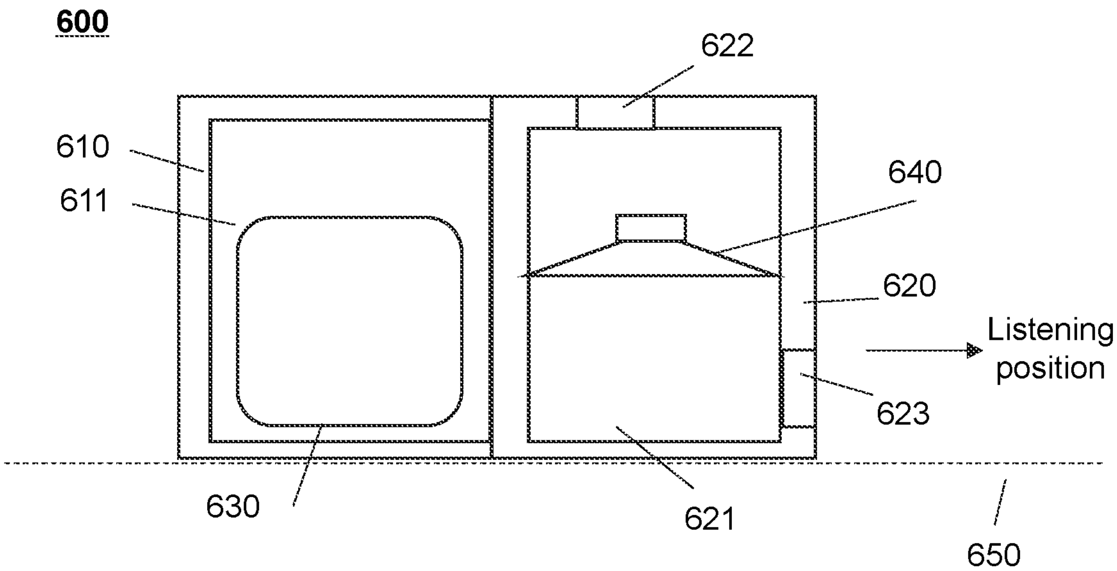
FIG. 6 is a schematic diagram of an exemplary acoustic output device according to some embodiments of the present disclosure.

FIG. 6 is a schematic diagram of an exemplary acoustic output device according to some embodiments of the present disclosure. As shown in FIG. 6, the acoustic output device 600 includes a first housing 610, a second housing 620, a bone conduction speaker 630, and an air conduction speaker 640. The bone conduction speaker 630 may be the same as or similar to the bone conduction speaker 500 in FIG. 5. The structure of the bone conduction speaker 630 may be simplified as indicated in FIG. 6. The bone conduction speaker 630 may be electrically coupled to the bone conduction signal processing circuits 316, and configured to generate bone conduction acoustic waves according to the bone conduction control signal generated by the bone conduction signal processing circuits 316. The bone conduction speaker 630 may be positioned on an inner side of a bottom wall of the first housing 610. The bone conduction acoustic waves generated by the bone conduction speaker 630 may be transferred to a user via the bottom wall of the first housing 610. The bottom wall may be in contact with the skin (e.g., represented by a dotted line 650) of the user. In some embodiments, the vibrating plate of the bone conduction 630 may be mechanically connected to the bottom wall of the first housing 610, or the bottom wall of the first housing 610 may be part of the bone conduction speaker 630 and can be regarded as the vibrating plate of the bone conduction speaker 630. In such cases, the vibrating plate may vibrate in a direction that is perpendicular or substantially perpendicular to the skin (the dotted line 650) of the user. In some alternative embodiments, the bone conduction speaker 630 may be positioned on an upper wall of the first housing 610 that is opposite to the bottom wall of the first housing 610. As used in the present disclosure, two directions may be regarded as being substantially parallel to each other if the difference between the angle formed by the two directions and 0 degree (or 180 degrees) is less than a threshold degree (e.g., 2 degrees, 5 degrees, 10 degrees). Similarly, two directions may be regarded as being substantially perpendicular to each other if the difference between the angle formed by the two directions and 90 degrees is less than the threshold degree (e.g., 2 degrees, 5 degrees, 10 degrees).

The air conduction speaker 640 may be coupled to the air conduction signal processing circuits 317, and configured to generate air conduction acoustic waves according to the air conduction control signal generated by the air conduction signal processing circuits 317. The air conduction speaker 640 may be arranged alongside the bone conduction speaker 630. Specifically, the bone conduction speaker 630 and the air conduction speaker 640 may be arranged along a reference plane (e.g., the skin of the user or a plane in which the bottom wall of the first housing 610 is). And the air conduction speaker 640 may be located on a side of the bone conduction speaker 630.

The bone conduction speaker 630 may be located in a cavity 611 of the first housing 610. The air conduction speaker 640 may be located in a cavity 621 of the second housing 620. The cavity 611 of the first housing 610 and the cavity 621 of the second housing 620 may not be interconnected. The second housing 620 may also be arranged alongside the first housing 610. In some embodiments, the first housing 610 and the second housing 620 may be fixedly connected and attached to each other. For example, the first housing 610 and the second housing 620 may share a same side wall between them. In some embodiments, the first housing 610 and the second housing 620 may be spaced apart (e.g., there is a distance between the first housing 610 and the second housing 620) and be connected to each other via a connection component.

A front side of a diaphragm of the air conduction speaker 640 may face towards any direction. In some embodiments, the front side of the diaphragm of the air conduction speaker 640 may face downwards relative to the bottom wall of the second housing 620 (i.e., towards the dotted line 650 in FIG. 6). A vibration direction of the bone conduction speaker 630 (i.e., the direction in which the bone conduction acoustic waves propagated out of the bone conduction speaker 630) may be perpendicular to or substantially perpendicular to the skin of the user, and a central vibration direction of the diaphragm of the air conduction speaker 640 may also be in a direction perpendicular to or substantially perpendicular to the skin of the user. As used herein, the central vibration direction of the diaphragm refers to a vibration direction of a center of the diaphragm of the air conduction speaker 640. The vibration direction of the bone conduction speaker 630 may be identical to the vibration direction of the vibrating plate of the bone conduction speaker 630. In this case, the central vibration direction of the diaphragm of the air conduction speaker 640 may be in parallel to the vibration direction of the bone conduction speaker 630.

In some embodiments, at least one sound hole may be set on a wall of the second housing 620. The at least one sound hole may lead the air conduction acoustic waves to propagate out of the cavity 621. For example, a first sound hole 622 may be set on an upper wall of the second housing 620. A second sound hole 623 may be set on a side wall of the second housing 620. In some embodiments, the second sound hole 623 may be located below the front surface of the air conduction speaker 640 (e.g., the diaphragm of the air conduction speaker 640) in a vertical direction perpendicular to the bottom wall of the second housing 620.

When the user wears the acoustic output device 600, the first housing 610 may be attached to the user's skin directly or indirectly. The bottom wall of the first housing 610 that is in contact with the user's skin may transfer the bone conduction acoustic waves to a cochlea of the user via the skin and bones of the user. In some embodiments, in comparison with the bone conduction speaker 630, the air conduction speaker 640 may be closer to a listening position (e.g., a position of an ear of the user). The second sound hole 623 on the second housing 620 may be set towards the listening position such that air conduction acoustic waves may propagate to the ear of the user directly, thus reducing sound loss and enhancing a sound volume heard by the user.

It should be noted that the at least one sound hole (e.g., the sound holes 622 and 623) may be provided for illustration purposes, and not intended to be limiting. In some alternative embodiments, the sound hole 623 may not be necessary. The front cavity of the second housing 620 may be omitted. The air conduction acoustic waves generated by the diaphragm of the air conduction speaker 640 may propagate outside of the second housing 620 directly. In such cases, the diaphragm of the air conduction speaker may form a wall (e.g., bottom wall) of the second housing 620. In some embodiments, one or more additional acoustic structures (e.g., a tuning net, a decompressing hole, a sound tube, etc.) may be provided.

The bone conduction speaker 630 may be electrically coupled to the bone conduction signal processing circuit 316. The bone conduction speaker 630 may generate and output bone conduction acoustic waves in a particular frequency range (e.g., a low frequency range, a medium frequency range, a high frequency range, a mid-low frequency range, a mid-high frequency range, etc.) according to the bone conduction control signals generated by the bone conduction signal processing circuits 316. The air conduction speaker 640 may be electrically coupled to the air conduction signal processing circuit 317. The air conduction speaker 640 may generate and output air conduction acoustic waves in a same or different frequency ranges as the bone conduction speaker 630 according to the air conduction control signals generated by the air conduction signal processing circuits 317.

For example, the bone conduction acoustic waves may include mid-high frequencies, and the air conduction acoustic waves may include mid-low frequencies. The air conduction acoustic waves of mid-low frequencies may be used as a supplement to the bone conduction acoustic waves of mid-high frequencies. A total output of the acoustic output device may cover the mid-low frequencies and the mid-high frequencies. In this case, better sound quality (especially at low frequencies) may be provided, and intense vibrations of the bone conduction speaker at low frequencies may be avoided.

As another example, the bone conduction acoustic waves may include mid-low frequencies, and the air conduction acoustic waves may include mid-high frequencies. In this case, the acoustic output device may provide prompts or warnings to a user via the bone conduction speaker and/or the air conduction speaker since the user is sensitive to the bone conduction acoustic waves of mid-low frequencies and/or the air conduction acoustic waves of mid-high frequencies.

As a further example, the air conduction acoustic waves may include mid-low frequencies, and the bone conduction acoustic waves may include frequencies in a wider frequency range (wide range frequencies) than the air conduction acoustic waves. The output of the mid-low frequencies may be enhanced, and the sound quality may be improved. More details regarding the frequency distributions of the bone conduction acoustic waves and/or the air conduction acoustic waves can be found elsewhere in the present disclosure, for example, FIGS. 17-21.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, relative positions of the bone conduction speaker 630 and the air conduction speaker 640, the mass, shapes and/or sizes of the first housing 610 and/or the second housing 620, one or more additional acoustic structures, etc., may be modified and optimized according to various needs, which is not limited in the present disclosure.

Figure 7:
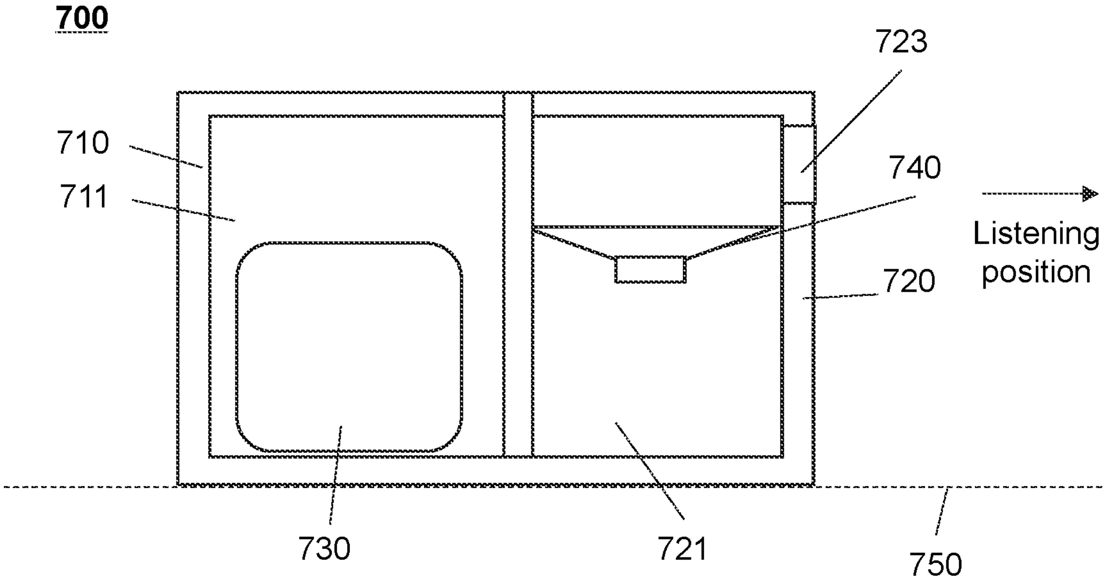
FIG. 7 is a schematic diagram of an exemplary acoustic output device according to some embodiments of the present disclosure.

FIG. 7 is a schematic diagram of an exemplary acoustic output device according to some embodiments of the present disclosure. In some embodiments, the acoustic output device 700 may be the same as or similar to the acoustic output device 600 except that a front side of a diaphragm of an air conduction speaker 740 may face upwards relative to the bottom of a second housing 720 (i.e., towards an upper wall of the second housing 720). A bottom wall of a first housing 710 accommodating a bone conduction speaker 730 may be in contact with the skin (e.g., represented by a horizontal dotted line 750) of a user when the user wears the acoustic output device 700.

In some embodiments, a sound hole 723 may be set on a side wall of the second housing 720. The sound hole 723 may be set above the front surface of the air conduction speaker 740 (e.g., the surface of the diaphragm of the air conduction speaker 740) in a direction perpendicular to the bottom wall of the second housing 720. Additionally, a decompression hole (not shown in FIG. 7) may be set on the side wall of the second housing 720. The decompression hole may be set below the front surface of the air conduction speaker 740 in the direction perpendicular to the bottom wall of the second housing 720.

Figure 8:
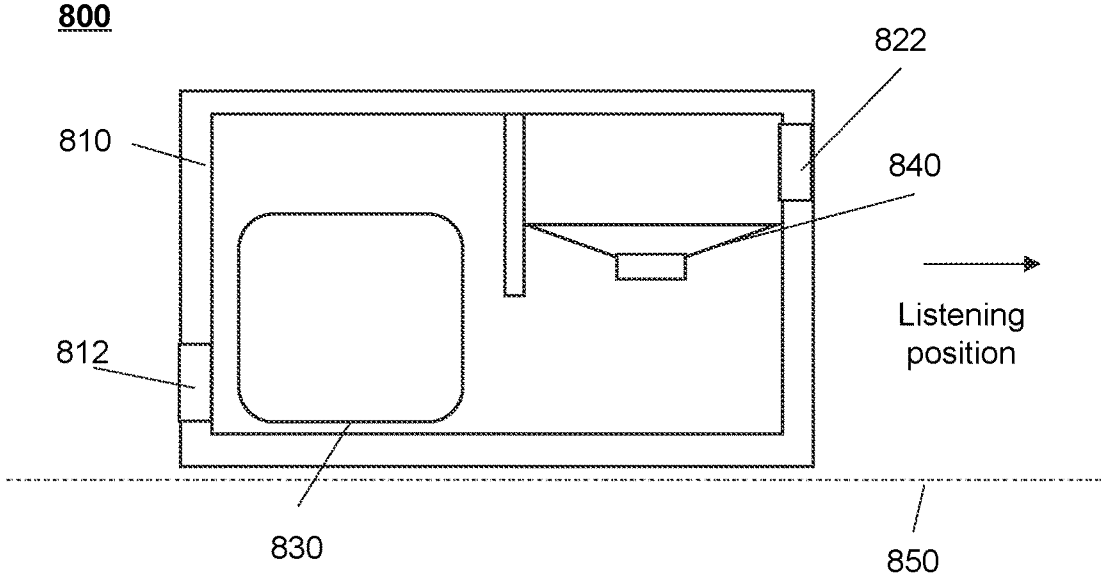
FIG. 8 is a schematic diagram of an exemplary acoustic output device according to some embodiments of the present disclosure.

FIG. 8 is a schematic diagram of an exemplary acoustic output device according to some embodiments of the present disclosure. As shown in FIG. 8, the acoustic output device 800 may include a housing 810, a bone conduction speaker 830, and an air conduction speaker 840. In some embodiments, the acoustic output device 800 may be similar to the acoustic output device 700 except that the bone conduction speaker 830 and the air conduction speaker 840 may share a same cavity of the housing 810. The bone conduction speaker 830 may be positioned on an inner side of a bottom wall of the housing 810. Bone conduction acoustic waves generated by the bone conduction speaker 830 may be transferred to a user via the bottom wall of the housing 810. The bottom wall of the housing 810 may be in contact with the skin (e.g., represented by a dotted line 850) of the user. The air conduction speaker 840 may be arranged alongside the bone conduction speaker 830 within the housing 810.

In some embodiments, the housing 810 may define a front cavity along with the front surface of the air conduction speaker 840 (e.g., the surface of the diaphragm of the air conduction speaker 840). The front surface of the air conduction speaker 840 may face upwards relative to the bottom wall of the housing 810, and radiate the air conduction acoustic waves towards the front cavity. In some embodiments, the air conduction speaker 840 may be fixed between a side wall of the housing 810 and a fixing side protruding into the cavity of the housing 810. For example, the fixing side may extend in a vertical direction perpendicular to the bottom wall of the housing 810. A combination of the fixing side, the side wall of the housing 810, and the diaphragm of the air conduction speaker 840 may form a front cavity of the air conduction speaker 840.

In some embodiments, the housing 810 may be provided with at least one sound hole. For example, a sound hole 822 may be set on a side wall of the front cavity of the housing 810. In some embodiments, the sound hole 822 may face towards a listening position (e.g., the ear of the user when the user wears the acoustic output device 800). The sound hole 822 may be located above the front surface of the air conduction speaker (e.g., the surface of the diaphragm of the air conduction speaker 840) in the vertical direction perpendicular to the bottom wall of the housing 810. In some alternative embodiments, the front surface of the air conduction speaker 840 (e.g., the surface of the diaphragm of the air conduction speaker 840) may face downwards relative to the bottom of the housing 810. In such cases, the position of the sound hole 822 may change accordingly. In some embodiments, the housing 810 may also be provided with a decompression hole 812 for balancing a pressure in the back cavity of the air conduction speaker 840 defined by the housing 810. As shown in FIG. 8, the bone conduction speaker 830 may be located inside the back cavity of the air conduction speaker 840. The decompression hole 812 and the air conduction speaker 840 may be located at opposite sides of the bone conduction speaker 830. The distance between the sound hole 822 and the air conduction speaker 840 may be shorter than the distance between the decompression hole 812 and the air conduction speaker 840.

Figure 9:
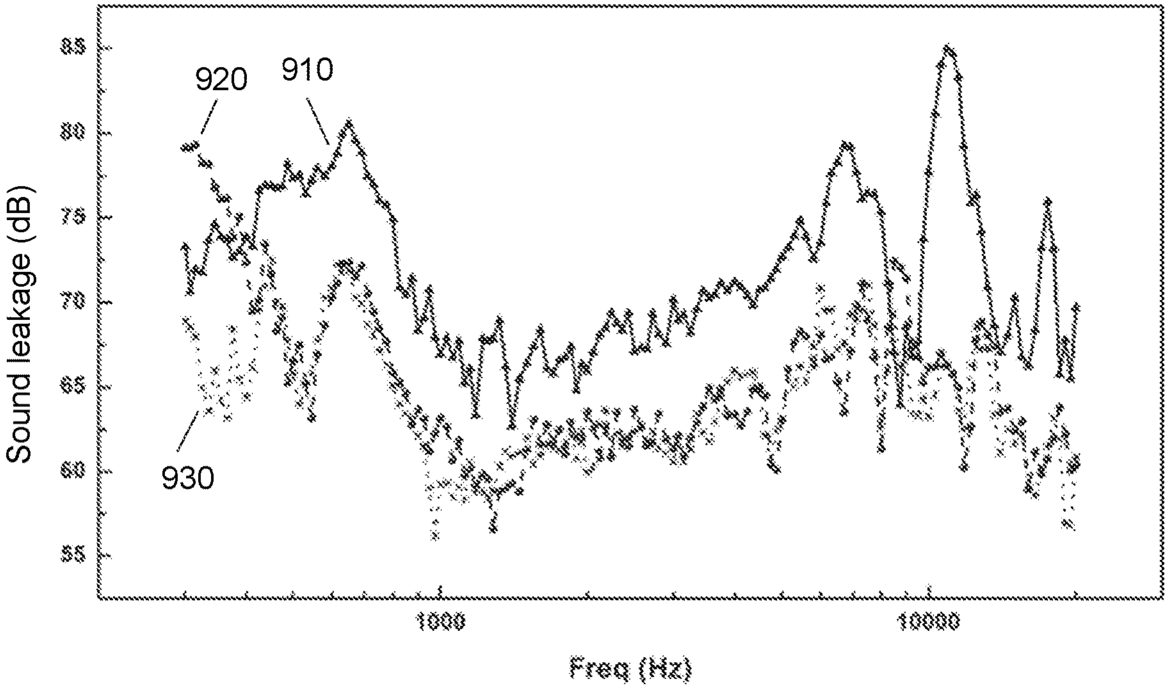
FIGS. 9 and 10 are schematic diagrams of leakage-frequency response curves of the acoustic output device 600 according to some embodiments of the present disclosure.
Figure 10:
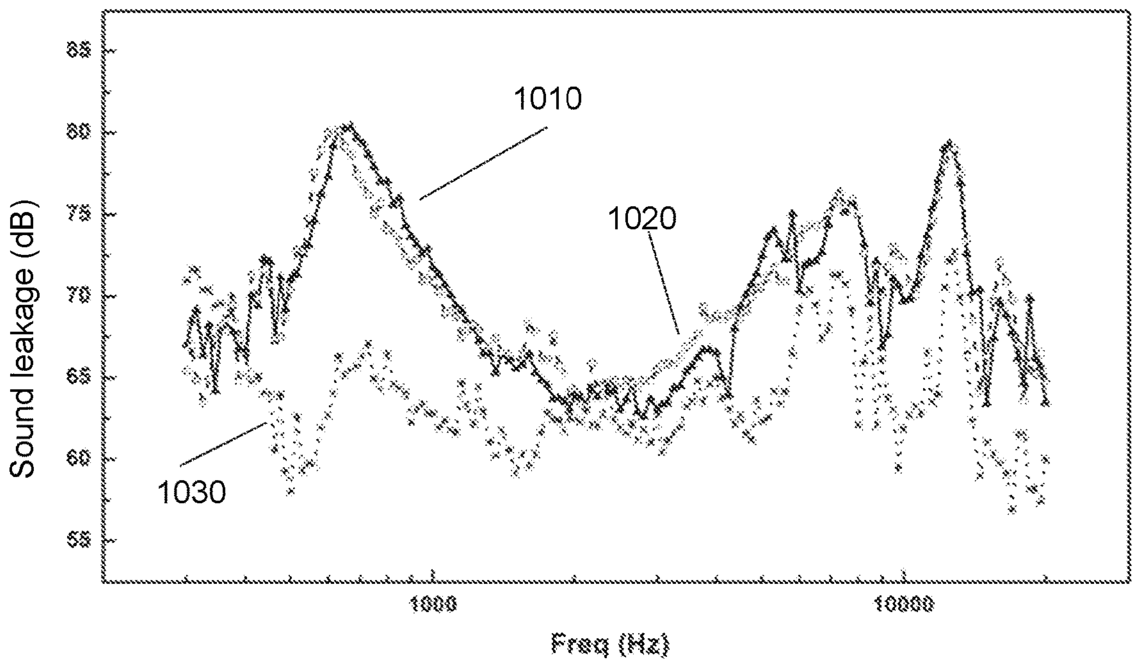

FIGS. 9 and 10 are schematic diagrams of leakage-frequency response curves of the acoustic output device 600 according to some embodiments of the present disclosure. A leakage-frequency response curve of the acoustic output device 600 refers to a curve representing a variation of the sound leakage of the acoustic output device 600 along with the frequency of the sound. As for the acoustic output device 600, the air conduction speaker 640 may be arranged alongside the bone conduction speaker 630. Leakage-frequency response curves of the acoustic output device 600 under various conditions may be provided. The horizontal axis may represent the frequency of the sound. The vertical axis may be a volume of a sound leakage of the acoustic output device 600. As shown in FIG. 9, a first leakage-frequency response curve 910 under a condition that the acoustic output device 600 merely includes the bone conduction speaker 630 (the air conduction speaker 640 is omitted) is provided. A second leakage-frequency response curve 920 under a condition that the at least one sound hole is set on a wall of the front cavity of the second housing 620 is provided. And a third leakage-frequency response curve 930 under a condition that the at least one sound hole on a wall of the front cavity of the second housing 620 is omitted is provided. As shown in FIG. 10, a fourth leakage-frequency response curve 1010 under a condition that the at least one sound hole is set on a wall of the back cavity of the second housing 620 is provided. A fifth leakage-frequency response curve 1020 under a condition that the at least one sound hole on a wall of the back cavity of the second housing 620 is omitted is provided. And a sixth leakage-frequency response curve 1030 under a condition that the mass of the second housing 620 is increased is provided.

It may be inferred that, the sound leakage under the condition that the acoustic output device 600 merely includes the bone conduction speaker 630 (the air conduction speaker 640 is omitted) at most frequencies is greater than the condition that the acoustic output device 600 includes both the bone conduction speaker 630 and the air conduction speaker 640. Thus, the combination of the bone conduction speaker 630 and the air conduction speaker 640 may reduce the sound leakage when the air conduction speaker 640 is arranged alongside the bone conduction speaker 630. In addition, the arrangement of the at least one sound hole on a wall of the front cavity or the back cavity of the housing 620 may have little influence on the sound leakage of the acoustic output device 600. It may also be inferred that, vibration amplitudes of non-vibrating walls of the first housing 610 (e.g., the upper wall and the side walls of the first housing 610) and the second housing 620 may be reduced by increasing the mass of the acoustic output device 600 and a stiffness of the walls of the first housing 610 and/or the second housing 620. Thus, the sound leakage of the acoustic output device 600 in a specific frequency range (e.g., a frequency range greater than 400 Hz) may be reduced effectively.

Figure 11:
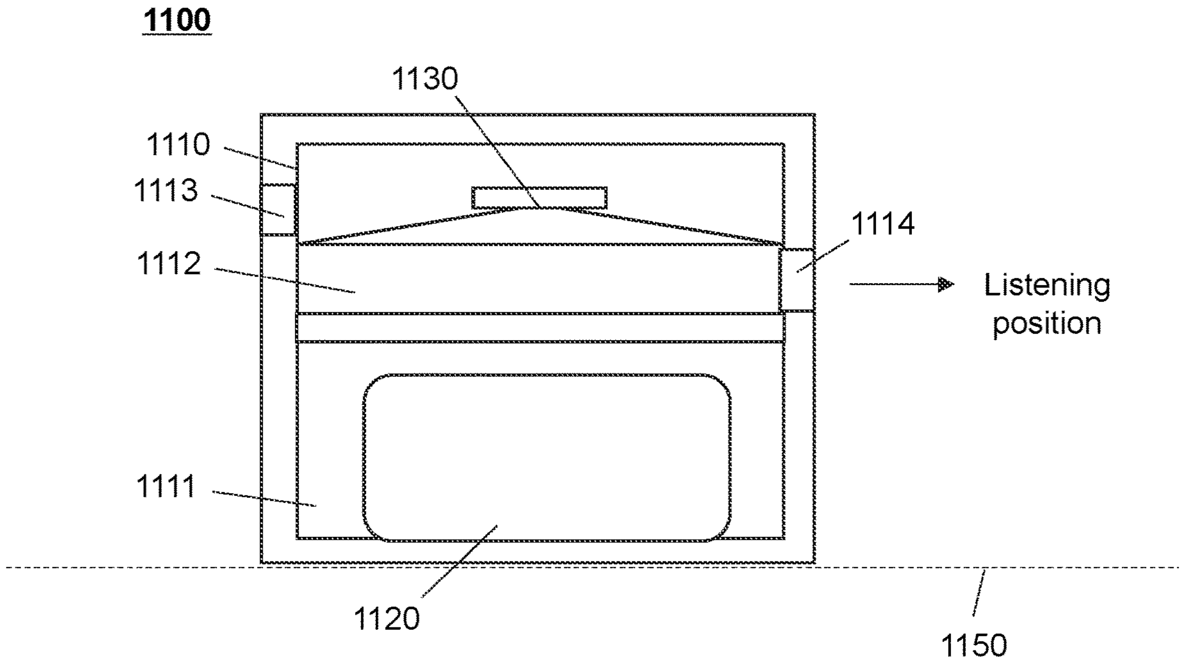
FIG. 11 is a schematic diagram of an exemplary acoustic output device according to some embodiments of the present disclosure.

FIG. 11 is a schematic diagram of an exemplary acoustic output device according to some embodiments of the present disclosure. As shown in FIG. 11, the acoustic output device 1100 may include a housing 1110, a bone conduction speaker 1120, and an air conduction speaker 1130. The bone conduction speaker 1120 may be positioned on an inner side of a bottom wall of the housing 1110. Bone conduction acoustic waves generated by the bone conduction speaker 1120 may be transferred to a user via the bottom wall of the housing 1110. The bottom wall may be in contact with the skin (e.g., represented by a dotted line 1150) of the user. In some embodiments, the vibrating plate of the bone conduction 1120 may be mechanically connected to the bottom wall of the housing 1110, or the bottom wall of the housing 1110 may be part of the bone conduction speaker 1120 and can be regarded as the vibrating plate of the bone conduction speaker 1120. In such cases, the vibrating plate may vibrate in a direction that is perpendicular or substantially perpendicular to the skin (the dotted line 1150) of the user. In some alternative embodiments, the bone conduction speaker 1120 may be positioned on an upper wall of the housing 1110 that is opposite to the bottom wall of the housing 1110. The air conduction speaker 1130 and the bone conduction speaker 1120 may be in a stacked arrangement. Specifically, the air conduction speaker 1130 may be positioned above the bone conduction speaker relative to a reference plane (e.g., the skin of the user or a plane on which the bottom wall of the housing 1110 is). The housing 1110 may include a first cavity 1111 and a second cavity 1112 that are sequentially arranged along a direction from an upper wall to the bottom wall of the housing 1110. In some embodiments, the first cavity 1111 and the second cavity 1112 may not be interconnected. For example, the first cavity 1111 and the second cavity 1112 may be separated by a membrane, an internal wall of the housing 1110, etc. The bone conduction speaker 1120 may be located in the first cavity 1111 of the housing 1110. The air conduction speaker 1130 may be located in the second cavity 1112 of the housing 1110. The second cavity 1112 may be the front cavity of the air conduction speaker 1130, as shown in FIG. 11. Alternatively, the second cavity 1112 may be the back cavity of the air conduction speaker 1130 if the air conduction speaker 1130 is inversely located (i.e., upside down).

In some embodiments, the front side of the air conduction speaker 1130 may face towards the bottom of the housing 1110. The vibration direction of the bone conduction speaker 1120 (i.e., the direction in which the bone conduction acoustic waves propagated out of the bone conduction speaker 1120) may be perpendicular to the skin of the user, and the central vibration direction of the diaphragm of the air conduction speaker 1130 may also be in a direction perpendicular to the skin of the user. In this case, the central vibration direction of the diaphragm of the air conduction speaker 1130 may be the same as the vibration direction of the bone conduction speaker 1120.

In some embodiments, in order to reduce the sound leakage of the acoustic output device 1100, a decompression hole 1113 may be provided on a side wall of the housing 1110. The decompression hole 1113 may interconnect the back cavity of the air conduction speaker 1130 with the outside, and also be referred to as a back cavity sound hole. In some embodiments, a sound hole 1114 may be set on a side wall of the front cavity 1112 of the air conduction speaker 1130. The sound hole 1114 may interconnect the front cavity 1112 with the outside. In some embodiments, the sound hole 1114 may be located below a front surface of the air conduction speaker 1130 (e.g., a surface of a diaphragm of the air conduction speaker 1130). The sound hole 1114 may transmit air conduction acoustic waves to a listening position (e.g., an ear of the user when the user wears the acoustic output device 1100).

In some embodiments, in comparison with the bone conduction speaker 1120, the air conduction speaker 1130 may be closer to the listening position, and the sound hole 1114 may face towards the listening position, such that the air conduction acoustic waves may propagate to the listening position directly through the sound hole 1114. In some alternative embodiments, the sound hole 1114 may not be necessary. The front cavity of the housing 1110 (e.g., a side wall facing towards the listening position) may be omitted. The air conduction acoustic waves generated by the diaphragm of the air conduction speaker 1130 may propagate outside of the housing 1110 directly. In such a case, the diaphragm of the air conduction speaker may form a wall of the housing 1110.

The bone conduction speaker 1120 may be electrically coupled to the bone conduction signal processing circuit 316. The bone conduction speaker 1120 may generate and output bone conduction acoustic waves in a particular frequency range (e.g., a low frequency range, a medium frequency range, a high frequency range, a mid-low frequency range, a mid-high frequency range, etc.) according to the bone conduction control signals generated by the bone conduction signal processing circuits 316. The air conduction speaker 1130 may be electrically coupled to the air conduction signal processing circuit 317. The air conduction speaker 1130 may generate and output air conduction acoustic waves in a same or different frequency ranges as the bone conduction speaker 1120 according to the air conduction control signals generated by the air conduction signal processing circuits 317.

For example, the bone conduction acoustic waves may include mid-high frequencies, and the air conduction acoustic waves may include mid-low frequencies. The air conduction acoustic wave of mid-low frequencies may be used as a supplement to the bone conduction acoustic waves of mid-high frequencies. A total output of the acoustic output device may cover the mid-low frequencies and the mid-high frequencies. In this case, better sound quality (especially at low frequencies) may be provided, and intense vibrations of the bone conduction speaker at low frequencies may be avoided.

More details regarding the frequency distributions of the bone conduction acoustic waves and/or the air conduction acoustic waves can be found elsewhere in the present disclosure, for example, FIGS. 17-21.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, relative positions of the bone conduction speaker 1120 and the air conduction speaker 1130, the mass, shape and/or size of the housing 1110, one or more additional acoustic structures, etc., may be modified and optimized according to various needs, which is not limited in the present disclosure. As another example, the bone conduction speaker 1120 and the air conduction speaker 1130 may be accommodated in two housings separately.

Figure 12:
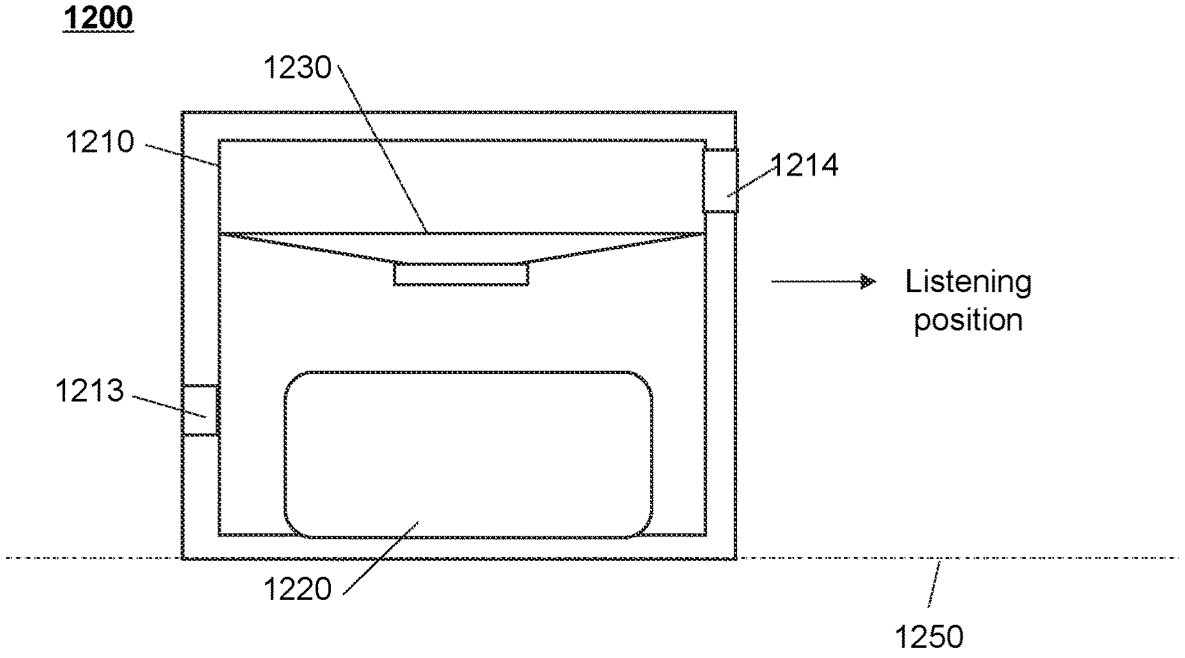
FIG. 12 is a schematic diagram of an exemplary acoustic output device according to some embodiments of the present disclosure.

FIG. 12 is a schematic diagram of an exemplary acoustic output device according to some embodiments of the present disclosure. As shown in FIG. 12, the acoustic output device 1200 may include a housing 1210, a bone conduction speaker 1220, and an air conduction speaker 1230. In some embodiments, the acoustic output device 1200 may be the same as or similar to the acoustic output device 1100 except that a front side of a diaphragm of the air conduction speaker 1230 may face upwards relative to the bottom wall of the housing 1210 (i.e., towards an upper wall of the housing 1210). The bone conduction speaker 1220 may be positioned on an inner side of a bottom wall of the housing 1210. Bone conduction acoustic waves generated by the bone conduction speaker 1120 may be transferred to a user via the bottom wall of the housing 1210. The bottom wall may be in contact with the skin (e.g., represented by a dotted line 1150) of the user. The air conduction speaker 1230 and the bone conduction speaker 1220 may be in a stacked arrangement. In some embodiments, the air conduction speaker 1230 and the bone conduction speaker 1220 may be sequentially arranged along a direction from an upper wall to the bottom wall of the housing 1210. The air conduction speaker 1230 and the bone conduction speaker 1220 may share a same cavity of the housing 1210. In some embodiments, the front side of the air conduction speaker 1230 may face upwards relative to the bottom wall of the housing 1210.

In some embodiments, a sound hole 1214 may be set on a side wall of the housing 1210. For example, the sound hole 1214 may be set on a side wall of the front cavity of the air conduction speaker 1120. In some embodiments, a decompression hole 1213 may be set on a side wall of the housing 1210. For example, the decompression hole 1213 may be set on a side wall of the back cavity of the air conduction speaker 1120. The bone conduction speaker 1220 may also be located in the back cavity of the air conduction speaker 1230.

Figure 13:
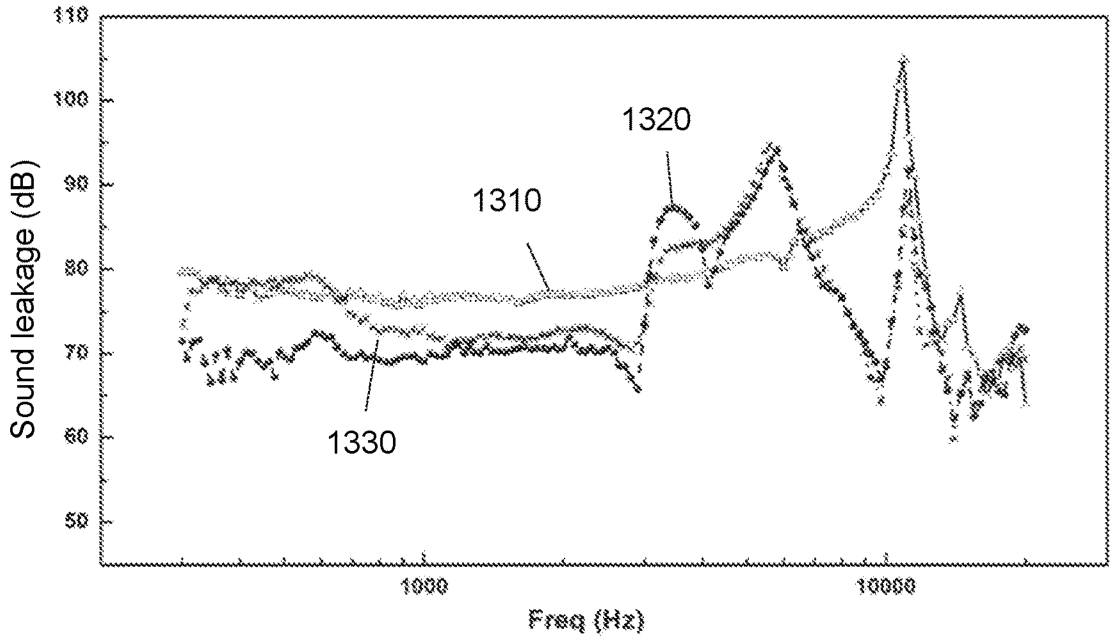
FIGS. 13 and 14 are schematic diagrams of leakage-frequency response curves of the acoustic output device 1100 according to some embodiments of the present disclosure.
Figure 14:
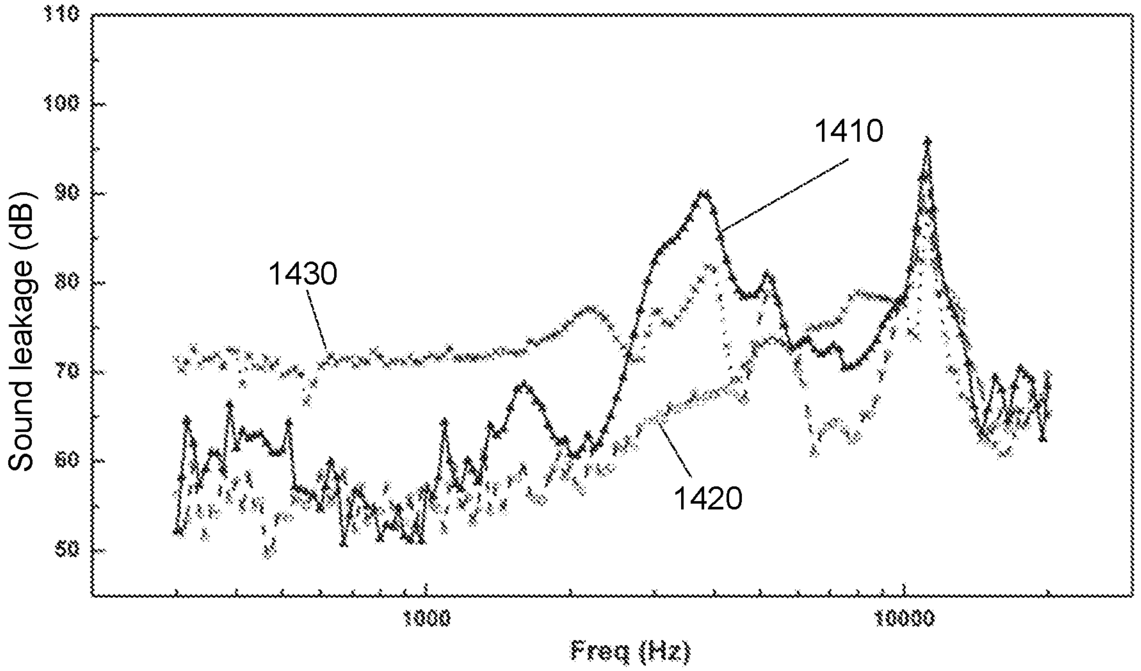

FIGS. 13 and 14 are schematic diagrams of leakage-frequency response curves of the acoustic output device 1100 according to some embodiments of the present disclosure. The air conduction speaker 1130 and the bone conduction speaker 1120 of the acoustic output device 1100 may be in a stacked arrangement. Leakage-frequency response curves of the acoustic output device 1100 under various conditions may be provided. The horizontal axis may represent the frequency of the sound. The vertical axis may be a volume of a sound leakage of the acoustic output device 1100. As shown in FIG. 13, a first leakage-frequency response curve 1310 under a condition that the acoustic output device 1100 merely includes the bone conduction speaker 1120 (the air conduction speaker 1130 is omitted) is provided. A second leakage-frequency response curve 1320 under a condition that at least one sound hole on a wall of the back cavity of the housing 1110 is set is provided. And a third leakage-frequency response curve 1130 under a condition that the at least one sound hole on a wall of the back cavity of the housing 1110 is omitted is provided. As shown in FIG. 14, a fourth leakage-frequency response curve 1410 under a condition at least one sound hole on a wall of the front cavity of the housing 1110 is provided. A fifth leakage-frequency response curve 1420 under a condition that the at least one sound hole on a wall of the front cavity of the housing 1110 is omitted is provided. And a sixth leakage-frequency response curve 1430 under a condition that the mass of a portion of the housing 1110 is increased is provided.

It may be inferred that, the sound leakage under the condition that the acoustic output device 1100 merely includes the bone conduction speaker 1120 (the air conduction speaker 1130 is omitted) in specific frequency ranges (e.g., 1000 Hz-3000 Hz and 8000 Hz-10 kHz) is greater than under the condition that the acoustic output device 1100 includes both the bone conduction speaker 1120 and the air conduction speaker 1130. In addition, the arrangement of the at least one sound hole on a wall of the back cavity of the housing 1110 may reduce the sound leakage of the acoustic output device 1100 in specific frequency ranges (e.g., less than 1000 Hz). However, the arrangement of the at least one sound hole on a wall of the front cavity of the housing 1110 may increase the sound leakage of the acoustic output device 1100 in specific frequency ranges (e.g., 3000 Hz-10 kHz). It may also be inferred that, vibration amplitudes of non-vibrating walls of the housing 1110 may be reduced by increasing the mass of the acoustic output device 1100 and a stiffness of at least one wall of the housing 1110. Thus, the sound leakage of the acoustic output device 1100 in a specific frequency range (e.g., a frequency range of 6000-10000 Hz) may be reduced effectively.

Figure 15:
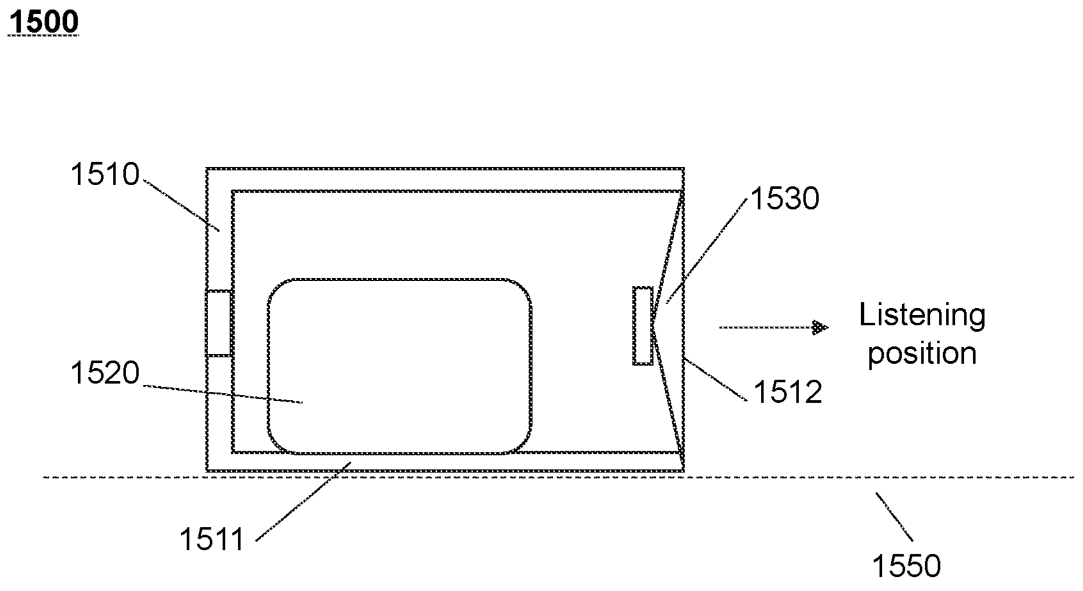
FIG. 15 is a schematic diagram of an exemplary acoustic output device according to some embodiments of the present disclosure.

FIG. 15 is a schematic diagram of an exemplary acoustic output device according to some embodiments of the present disclosure. As shown in FIG. 15, the acoustic output device 1500 may include a bone conduction speaker 1520 and an air conduction speaker 1530. The bone conduction speaker 1520 and the air conduction speaker 1530 may be accommodated in a same housing 1510. The bone conduction speaker 1520 may be positioned on an inner side of a bottom wall 1511 of the housing 1510. Bone conduction acoustic waves generated by the bone conduction speaker 1520 may be transferred to the user via the bottom wall 1511 of the housing 1510 when the user wears the acoustic output device 1500. The bottom wall 1511 may be in contact with the skin (e.g., represented by a dotted line 1550) of the user. In some embodiments, the vibrating plate of the bone conduction 1520 may be mechanically connected to the bottom wall of the housing 1510, or the bottom wall of the housing 1510 may be part of the bone conduction speaker 1520 and can be regarded as the vibrating plate of the bone conduction speaker 1520. In such cases, the vibrating plate may vibrate in a direction that is perpendicular to or substantially perpendicular to the skin (the dotted line 1550) of the user. In some alternative embodiments, the bone conduction speaker 1520 may be positioned on an upper wall of the housing 1510 that is opposite to the bottom wall of the housing 1510.

The air conduction speaker 1530 may be vertically arranged relative to the bone conduction speaker 1520. That is, the vibration direction of the vibrating plate of the bone conduction speaker 1511 may be vertical to the central vibration direction of the diaphragm of the air conduction speaker 1530. As shown in FIG. 15, the diaphragm 1512 of the air conduction speaker 1530 may form the side wall of the housing 1510, and thus no front cavity of the air conduction speaker 1530 exists. The front side of the diaphragm of the air conduction speaker 1530 may face towards a listening position. Air conduction acoustic waves generated by the air conduction speaker 1530 may propagate to the listening direction directly. In some alternative embodiments, a side wall of the housing 1510 may be provided before the diaphragm of the air conduction speaker 1530, thus forming a front cavity of the air conduction speaker 1530. Air conduction acoustic waves generated by the air conduction speaker 1530 may propagate to the listening direction through a sound hole set on a wall of the front cavity.

In some embodiments, the vibration direction of the bone conduction speaker 1520 (i.e., the direction in which the bone conduction acoustic waves propagated out of the bone conduction speaker 1520) may be in a direction perpendicular to the skin of the user (represented by the dotted line 1550), and the central vibration direction of the diaphragm of the air conduction speaker 1530 may be in parallel to the skin of the user (represented by the dotted line 1550). In this case, the central vibration direction of the diaphragm of the air conduction speaker 1530 may be substantially perpendicular to the vibration direction of the bone conduction speaker 1520. The vibration of the bone conduction speaker 1520 (or bone conduction acoustic waves generated by the bone conduction speaker 1520) may have no or little effect on the vibrations of the diaphragm of the air conduction speaker 1520, thereby obtaining a better sound effect of the acoustic output device 1500. It should be noted that the central vibration direction of the diaphragm of the air conduction speaker 1530 may not be perfectly perpendicular to the vibration direction of the bone conduction speaker 1520. For example, an angle between the two directions may be greater than or less than 90 degrees (e.g., 70 degrees, 80 degrees, 85 degrees, 95 degrees, 100 degrees, 115 degrees, etc.).

The bone conduction speaker 1520 may be electrically coupled to the bone conduction signal processing circuit 316. The bone conduction speaker 1520 may generate and output bone conduction acoustic waves in a particular frequency range (e.g., a low frequency range, a medium frequency range, a high frequency range, a mid-low frequency range, a mid-high frequency range, etc.) according to the bone conduction control signals generated by the bone conduction signal processing circuits 316. The air conduction speaker 1530 may be electrically coupled to the air conduction signal processing circuit 317. The air conduction speaker 1530 may generate and output air conduction acoustic waves in a same or different frequency ranges as the bone conduction speaker 1520 according to the air conduction control signals generated by the air conduction signal processing circuits 317.

For example, the bone conduction acoustic waves may include mid-high frequencies, and the air conduction acoustic waves may include mid-low frequencies. The air conduction acoustic wave of mid-low frequencies may be used as a supplement to the bone conduction acoustic waves of mid-high frequencies. A total output of the acoustic output device may cover the mid-low frequencies and the mid-high frequencies. In this case, better sound quality (especially at low frequencies) may be provided, and intense vibrations of the bone conduction speaker at low frequencies may be avoided.

More details regarding the frequency distributions of the bone conduction acoustic waves and/or the air conduction acoustic waves can be found elsewhere in the present disclosure, for example, FIGS. 17-21.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the number, locations, sizes, and/or shapes of sound holes and decompression holes set in the acoustic output device may not limited to the embodiments shown in the figure. In some embodiments, a sound tube may be coupled to the sound hole. In some alternative embodiments, the sound tube may be inserted into the housing 1510 through a wall directly. As another example, relative positions of the bone conduction speaker 1520 and the air conduction speaker 1530, the mass, shape and/or size of the housing 1510, one or more additional acoustic structures, etc., may be modified and optimized according to various needs, which is not limited in the present disclosure. As a further example, the bone conduction speaker 1520 and the air conduction speaker 1530 may be accommodated in two housings separately.

Figure 16:
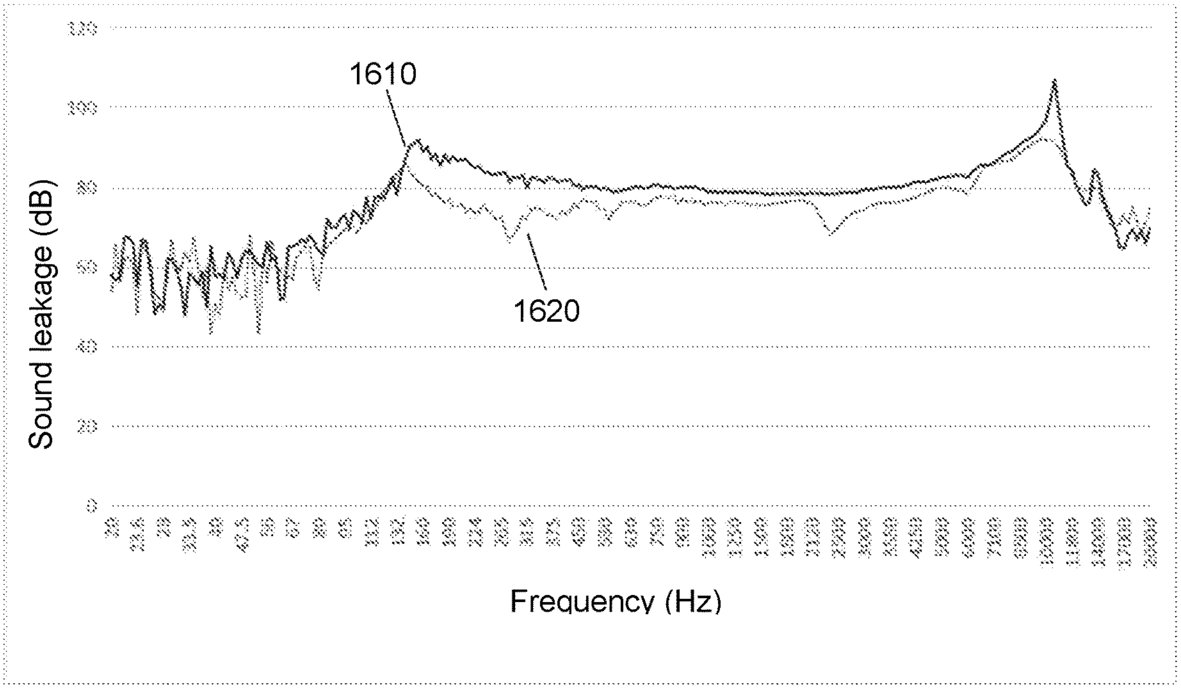
FIG. 16 is a schematic diagram of leakage-frequency response curves of the acoustic output device 1500 according to some embodiments of the present disclosure.

FIG. 16 is a schematic diagram of leakage-frequency response curves of the acoustic output device 1500 according to some embodiments of the present disclosure. The air conduction speaker 1530 of the acoustic output device 1500 may be embedded in the side wall 1512 of the housing 1510. In this case, the mass and rigidity of the side wall 1512 may be increased, vibrations of the housing 1510 may be reduced, thus reducing the sound leakage of the acoustic output device 1500. Leakage-frequency response curves of the acoustic output device 1500 under various conditions may be provided. The horizontal axis may represent the frequency of sound. The vertical axis may represent a volume of a sound leakage of the acoustic output device 1500. As shown in FIG. 16, a first leakage-frequency response curve 1610 under a condition that the acoustic output device 1500 merely includes the bone conduction speaker 1520 (the air conduction speaker 1530 is omitted) is provided. A second leakage-frequency response curve 1620 which represents the sound leakage of the acoustic output device 1500 at different frequencies is provided.

According to the leakage-frequency response curves 1610 and 1620, it may be inferred that in a specific frequency range (e.g., 150 Hz-10000 Hz), the sound leakage of the acoustic output device 1500 is smaller than the sound leakage of an acoustic output device merely includes a bone conduction speaker.

FIGS. 17-21 are schematic diagrams of curves of frequency response characteristics of an acoustic output device according to some embodiments of the present disclosure. The acoustic output device (e.g., the acoustic output device 600, 700, 800, 1100, 1200, or 1500) may include a bone conduction speaker and an air conduction speaker. The bone conduction speaker and the air conduction speaker may be independent of each other. The bone conduction speaker and the air conduction speaker may generate acoustic waves of different frequencies (e.g., mid-low frequencies, mid-high frequencies, etc.). The acoustic waves of different frequencies may be complementary so as to achieve specific output effects.

Figure 17:
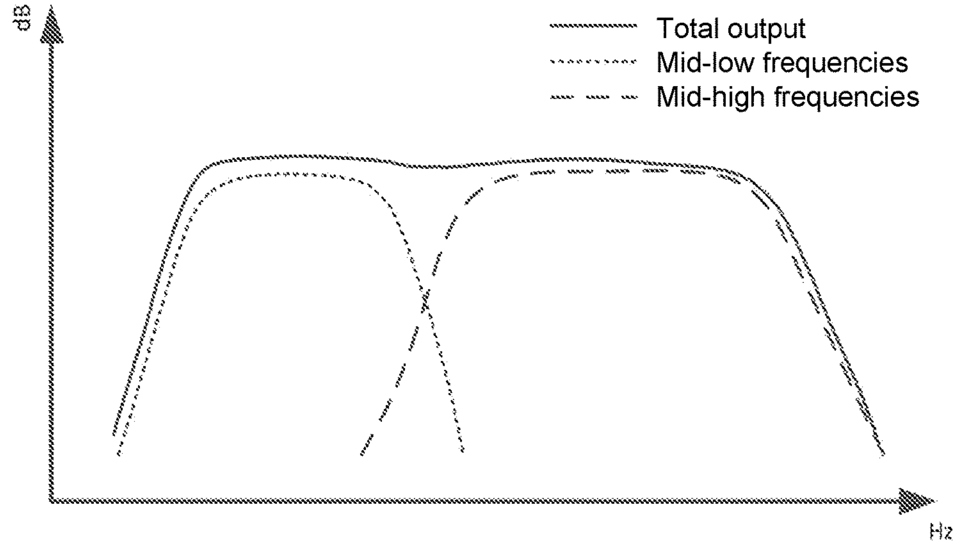
FIGS. 17-21 are schematic diagrams of curves of frequency response characteristics of an acoustic output device according to some embodiments of the present disclosure.

As shown in FIG. 17, bone conduction acoustic waves generated by the bone conduction speaker and air conduction acoustic waves generated by the air conduction speaker may include different frequencies. In some embodiments, the bone conduction acoustic waves may include mid-high frequencies (represented by the short dashed line in FIG. 17), and the air conduction acoustic waves may include mid-low frequencies (represented by the dotted line in FIG. 17). The air conduction acoustic waves including the mid-low frequencies (i.e., sounds of mid-low frequencies) may propagate to an ear of a user wearing the acoustic output device through air, and the bone conduction acoustic waves including the mid-high frequencies (i.e., sounds of mid-high frequencies) may propagate to the user through bones of the user. The sounds of mid-low frequencies may be used as a supplement to the sounds of mid-high frequencies. A total output (represented by the solid line in FIG. 17) of the acoustic output device may cover the mid-low frequencies and the mid-high frequencies. In this case, better sound quality (especially at low frequencies) may be provided, and intense vibrations of the bone conduction speaker at low frequencies may be avoided.

Generally, auditory of a person is more sensitive to mid-high frequencies, and tactility of a person is more sensitive to low-frequency frequencies. In some embodiments, the bone conduction acoustic waves may include mid-low frequencies (represented by the dotted line in FIG. 17), and the air conduction acoustic waves may include mid-high frequencies (represented by the short dashed line in FIG. 17). In this case, the acoustic output device may provide prompts or warnings to a user via the bone conduction speaker and/or the air conduction speaker since the user is sensitive to the bone conduction acoustic waves of mid-low frequencies and/or the air conduction acoustic waves of mid-high frequencies. It should be noted that the mid-low frequencies and the mid-high frequencies may overlap with each other. For example, the maximum frequency of the mid-low frequencies (e.g., the frequency corresponding to a half-power point of the curve of mid-low frequencies) may be greater than the minimum frequency of the mid-high frequencies (e.g., the frequency corresponding to a half-power point of the curve of mid-high frequencies). In some alternative embodiments, the mid-low frequencies and the mid-high frequencies may not overlap with each other.

Figure 18:
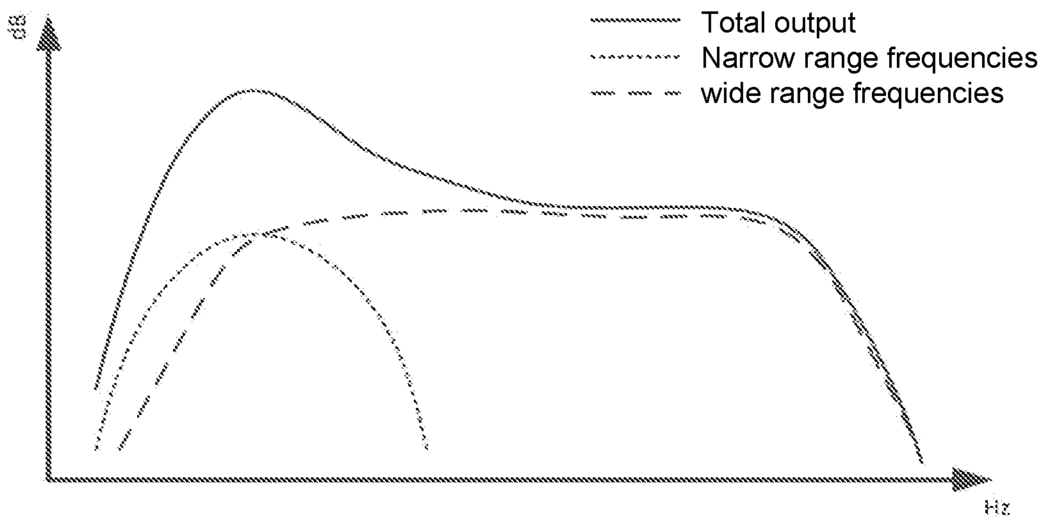

In some embodiments, the bone conduction acoustic waves and the air conduction acoustic waves may include same frequencies. As shown in FIG. 18, the bone conduction speaker and the air conduction speaker of the acoustic output device may generate acoustic waves of different frequencies (e.g., frequencies in a wider frequency range (also referred to as wide range frequencies represented by the short dashed line in FIG. 18), or frequencies in a narrower frequency range (also referred to as narrow range frequencies represented by the dotted line in FIG. 18)). The acoustic waves of different frequencies may be complementary to each other, thereby achieving specific sound effects. In some embodiments, the bone conduction acoustic waves and the air conduction acoustic waves may include same frequencies in a mid-low frequency range. In this case, a total output (represented by the solid line in FIG. 18) of acoustic waves of the acoustic output device in the mid-low frequency range may be greater than in the mid-high frequency range. In another word, the total output of the acoustic output device may be enhanced in the mid-low frequency range. Since an auditory threshold of a person is higher in the mid-low frequency range and lower in the mid-high frequency range (i.e., a person is more sensitive to sounds of the mid-high frequencies), the enhanced output of the acoustic waves in the mid-low frequency range may compensate for the above mentioned impact of the auditory threshold, thereby equalizing sounds of various frequencies heard by a person.

In some embodiments, the air conduction acoustic waves may include mid-low frequencies, and the bone conduction acoustic waves may include frequencies in a wider frequency range (wide range frequencies) than the air conduction acoustic waves. Thus, the output of the mid-low frequencies may be enhanced, and the sound quality may be improved. In the meanwhile, intense vibrations at mid-low frequencies may be avoided, thus improving a comfort level and auditory safety of the user. In some embodiments, the bone conduction acoustic waves may include mid-low frequencies, and the air conduction acoustic waves may include frequencies in a wider frequency range (wide range frequencies) than the bone conduction acoustic waves. By adding moderate vibrations at mid-low frequencies, tactile feelings of the user may be provided together with auditory feelings, thus enriching an audio experience of the user.

Figure 19:
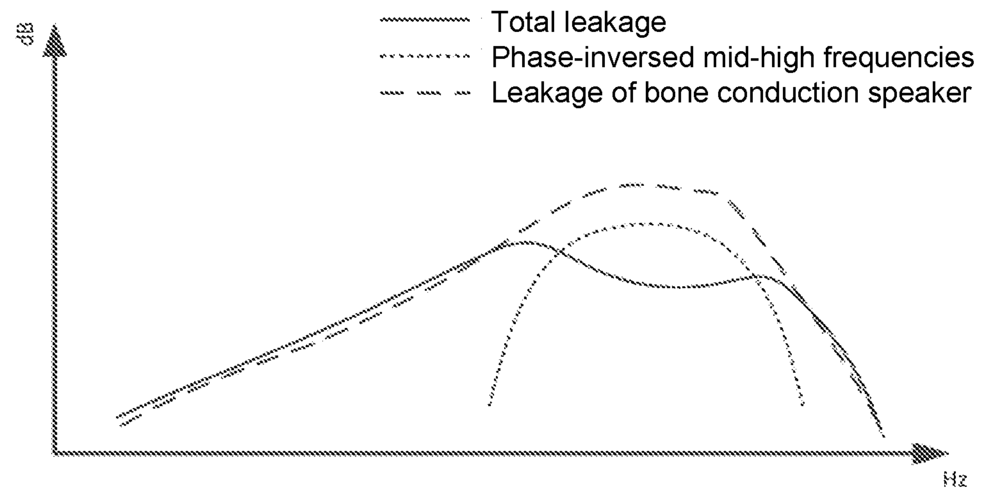

As shown in FIG. 19, the bone conduction acoustic waves and the air conduction acoustic waves may include same frequencies in the mid-high frequency range so as to increase a sound volume of mid-high frequencies or reduce the sound leakage of mid-high frequencies. In some embodiments, the air conduction acoustic waves may include mid-high frequencies (e.g., phase-inverted mid-high frequencies as indicated by the dotted line in FIG. 19), and bone conduction acoustic waves may include frequencies in a wider frequency range (wide range frequencies) than the air conduction acoustic waves. The air conduction acoustic waves may reduce or eliminate the sound leakage (e.g., the leakage of the bone conduction speaker as represented by the short dashed line in FIG. 19) of mid-high frequencies of the bone conduction speaker according to the principle of reversed phase cancellation. In this case, the total sound leakage (represented by the solid line in FIG. 19) of the acoustic output device may be reduced at mid-high frequencies.

Figure 20:
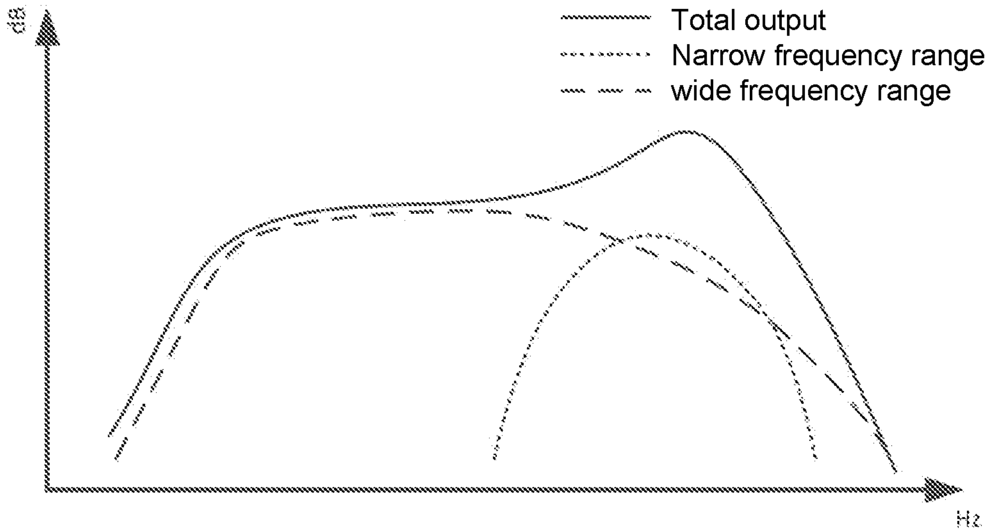

As shown in FIG. 20, the bone conduction acoustic waves may include mid-high frequencies (e.g., narrow range frequencies represented by the dotted line in FIG. 20), and the air conduction acoustic waves may include frequencies in a wider frequency range (e.g., wide range frequencies represented by the short dashed line in FIG. 20) than the bone conduction acoustic waves, thus enhancing the total output (represented by the solid line in FIG. 20) of acoustic waves of mid-high frequencies (e.g., improving a sound volume of the acoustic output device in the mid-high frequency range).

In practical application scenarios, for headphones equipped with an air conduction speaker, bone conduction acoustic waves generated by a bone conduction speaker may serve as a supplement for mid-high frequencies to the air conduction speaker. Since vibration amplitudes of the bone conduction speaker in the low frequency range is relatively large, facial vibration sense of the user may be relatively obvious, thus resulting in a poor user experience. In order to reduce or eliminate the vibrations, sounds of low frequencies of the bone conduction speaker may be suppressed (e.g., by a frequency divider or a crossover), which may result in a dramatical decrease of the low frequencies of the bone conduction speaker, thus degrading the sound quality. However, the air conduction speaker may be used to supplement the low frequencies. Specifically, the acoustic output device may output sounds of low frequencies via the air conduction speaker, and output sounds of medium frequencies and/or high frequencies via the bone conduction speaker, thus obtaining a balanced audio experience of the user.

Figure 21:
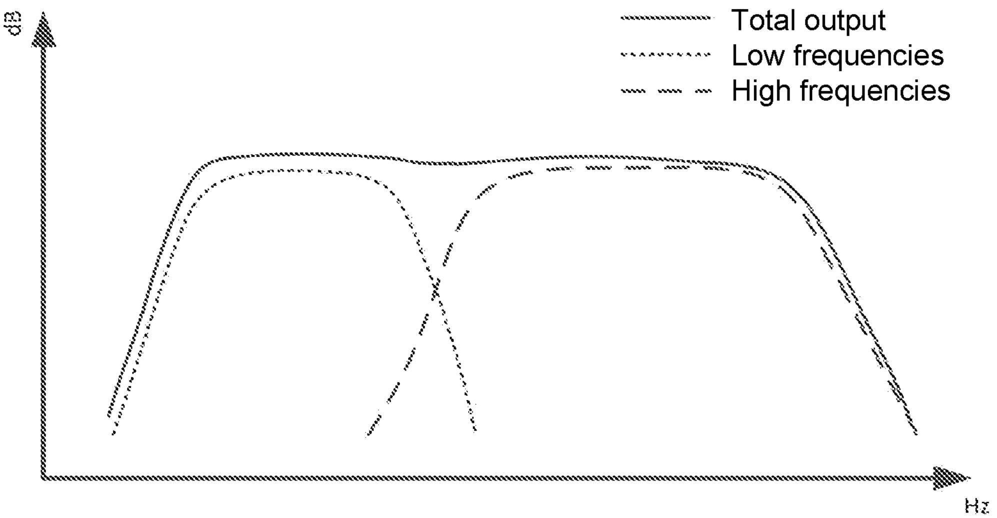

As shown in FIG. 21, the bone conduction speaker may output sounds of high frequencies (represented by the short dashed line in FIG. 21), and the air conduction speaker may output sounds of low frequencies (represented by the dotted line in FIG. 21). The acoustic output device may output sounds of both high frequencies and low frequencies, thus improving a comfort level of the user as well as maintaining the acoustic effect. In some embodiments, the high frequencies may refer to a frequency range greater than 300 Hz, 1000 Hz, 10 kHz, etc. Correspondingly, the low frequencies may refer to a frequency range less than 250 Hz, 500 Hz, 1 kHz, etc.

Figure 22:
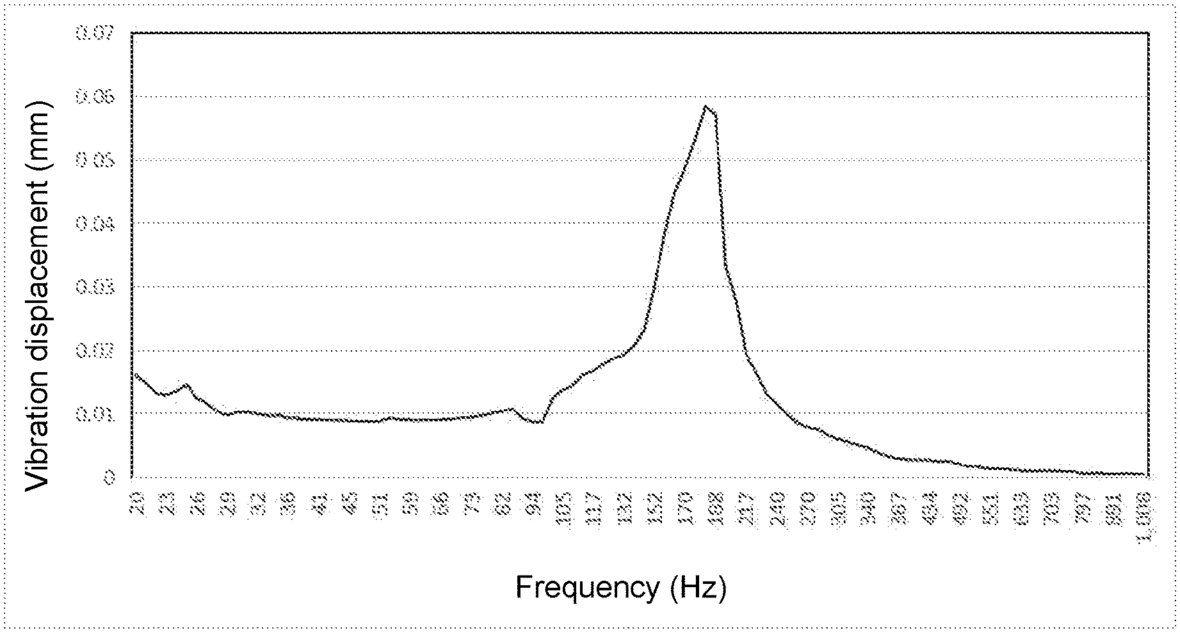
FIG. 22 is a schematic diagram of a vibration displacement-frequency spectrum of a bone conduction speaker according to some embodiments of the present disclosure.

FIG. 22 is a schematic diagram of a vibration displacement frequency spectrum of a bone conduction speaker according to some embodiments of the present disclosure. Vibration displacements of the bone conduction speaker at different frequencies may be measured by a laser vibrometer. As shown in FIG. 22, the bone conduction speaker has a resonance peak at about 180 Hz. Vibration amplitudes of the bone conduction speaker increase rapidly at about 100 Hz-250 Hz, which may be a vibration sensitive area. In some embodiments, a frequency division point of the bone conduction speaker and the air conduction speaker may be set at about 250 Hz. As such, the air conduction speaker may mainly generate air conduction acoustic waves with frequencies less than 250 Hz, and the bone conduction speaker may mainly generate bone conduction acoustic waves with frequencies above 250 Hz. As a result, the vibration amplitude of the bone conduction speaker may be kept within a relatively small range, thus reducing the facial vibration sense of the user effectively, and equalizing the acoustic effect.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. An acoustic output device, comprising:

a bone conduction speaker configured to generate bone conduction acoustic waves;

an air conduction speaker configured to, the air conduction speaker including a vibrating diaphragm, the vibrating diaphragm vibrating to generate air conduction acoustic waves, the air conduction speaker being independent of the bone conduction speaker; and at least one housing configured to accommodate the bone conduction speaker and the air conduction speaker, an angle formed between a vibration direction of the bone conduction speaker and a central vibration direction of the vibrating diaphragm of the air conduction speaker being 70°-115°, wherein the bone conduction acoustic waves are of mid-high frequencies, and the air conduction acoustic waves are of mid-low frequencies.

2. The acoustic output device of claim 1, wherein the bone conduction speaker includes a vibrating assembly, the vibration assembly including:

a magnetic circuit system configured to generate a magnetic field;

a vibrating plate connected to the at least one housing; and one or more coils connected to the vibrating plate, wherein the one or more coils vibrate in the magnetic field, and drive the vibrating plate to vibrate to generate the bone conduction acoustic waves.

3. The acoustic output device of claim 1, wherein the air conduction speaker includes a driver and a vibrating diaphragm, wherein the driver drives the vibrating diaphragm to vibrate to generate the air conduction acoustic waves.

4. The acoustic output device of claim 1, wherein the air conduction speaker is arranged alongside the bone conduction speaker.

5. The acoustic output device of claim 4, wherein the at least one housing includes a first housing and a second housing, the bone conduction speaker is accommodated in the first housing, and the air conduction speaker is accommodated in the second housing.

6. The acoustic output device of claim 1, wherein a distance from the air conduction speaker to a listening position is smaller than a distance from the bone conduction speaker to the listening position, wherein the listening position is a position of an ear of a user.

7. The acoustic output device of claim 5, wherein the second housing includes a sound hole facing towards a listening position.

8. The acoustic output device of claim 1, wherein the bone conduction speaker and the air conduction speaker are accommodated in a same housing.

9. The acoustic output device of claim 8, wherein the housing accommodating the bone conduction speaker and the air conduction speaker includes a wall for transferring the bone conduction acoustic waves outwards.

10. The acoustic output device of claim 8, wherein the housing accommodating the bone conduction speaker and the air conduction speaker includes a sound hole facing towards a listening position.

11. The acoustic output device of claim 1, wherein the bone conduction speaker and the air conduction speaker are vertically arranged.

12. The acoustic output device of claim 1, wherein the bone conduction acoustic waves include mid-high frequencies, and the air conduction acoustic waves include frequencies in a wider frequency range than the frequencies of the bone conduction acoustic waves.

13. The acoustic output device of claim 1, wherein a difference between 90 degrees and the angle formed between the vibration direction of the bone conduction speaker and the central vibration direction of the vibrating diaphragm of the air conduction speaker is less than a threshold degree.

14. The acoustic output device of claim 13, wherein the threshold degree being 2 degrees, 5 degrees, or 10 degrees.

15. The acoustic output device of claim 13, wherein the vibration direction of the bone conduction speaker is perpendicular to the central vibration direction of the vibrating diaphragm of the air conduction speaker.

16. The acoustic output device of claim 1, wherein the vibrating diaphragm of the air conduction speaker forms a side wall of the housing, such that the air conduction acoustic waves is transmitted to an outside of the housing without passing any front cavity.

17. The acoustic output device of claim 1, wherein a cavity of the housing is divided into two portions including a front cavity and a back cavity by the vibrating diaphragm, wherein at least a sound hole is set on a wall of the front cavity of the housing, a decompression hole is set on a wall of the back cavity of the housing.

* * * * *